US012654305B2

(12) United States Patent
Weber et al.

(10) Patent No.: US 12,654,305 B2
(45) Date of Patent: Jun. 16, 2026

(54) HANDHELD WORK APPARATUS

(71) Applicant: Andreas Stihl AG & Co. KG,
Waiblingen (DE)

(72) Inventors: Thomas Weber, Winterbach (DE);
Tobias Reichle, Stuttgart (DE); **David
Günther**, Rudersberg (DE)

(73) Assignee: Andreas Stihl AG & Co. KG,
Waiblingen (DE)

( * ) Notice: Subject to any disclaimer, the term of this
patent is extended or adjusted under 35
U.S.C. 154(b) by 0 days.

(21) Appl. No.: 19/218,512

(22) Filed: May 26, 2025

(65) Prior Publication Data

US 2025/0367808 A1     Dec. 4, 2025

(30) Foreign Application Priority Data

May 28, 2024    (DE) ......................... 102024114997.3

(51) Int. Cl.
B25F 5/02          (2006.01)
H01M 50/247     (2021.01)

(52) U.S. Cl.
CPC ............. B25F 5/02 (2013.01); H01M 50/247
(2021.01); H01M 2220/30 (2013.01)

(58) Field of Classification Search
None
See application file for complete search history.

(56) References Cited

U.S. PATENT DOCUMENTS 8,389,143  B2 *   3/2013  Roßkamp ................. B25F 5/02
                                                              429/100
2010/0218966  A1 *   9/2010  Liebhard ................ A01G 3/053
                                                              318/722
2010/0218967  A1 *   9/2010  Ro kamp ............... A01G 3/053
                                                              173/217
2010/0221594  A1     9/2010  Roskamp et al.
2012/0067608  A1 *   3/2012  Heinzelmann ............ B25F 5/02
                                                              173/217
2015/0165640  A1 *   6/2015  Ro .......................... B27B 17/08
                                                              30/381
2015/0251258  A1 *   9/2015  Jiang .................... B23D 57/023
                                                              30/381
2018/0207831  A1 *   7/2018  Masatoshi ................. B25F 5/02

* cited by examiner

*Primary Examiner* — Tanzim Imam
(74) *Attorney, Agent, or Firm* — Smartpat PLC

(57)          ABSTRACT
A hand-held work apparatus includes a tool, an electric
motor for driving the tool, a battery and a battery compart-
ment for accommodating the battery. The battery can be
inserted into the battery compartment in an insertion direc-
tion and has a first and second outer side which oppose each
other. The work apparatus comprises a position stabilisation
device having at least one first and second positioning
element on the battery compartment and having at least one
first counter element on the first outer side of the battery and
having at least one second counter element on the second
outer side of the battery on the battery. In a ready-to-use state
of the work apparatus, the first positioning element corre-
sponds to the first counter element and the second position-
ing element corresponds to the second counter element. The
battery is arranged between the first positioning element and
the second positioning element.

16 Claims, 11 Drawing Sheets

HANDHELD WORK APPARATUS

CROSS-REFERENCE TO RELATED APPLICATION

This application claims the benefit of German Patent Application DE 102024114997.3, filed on May 28, 2024, the content of which is incorporated in its entirety.

TECHNICAL FIELD

The disclosure relates to a hand-held work apparatus and to a method for producing a ready-to-use state of a hand-held work apparatus.

BACKGROUND

A battery-operated chainsaw having a battery compartment for accommodating the battery is known from U.S. Pat. No. 8,757,288. The battery compartment has guide webs for guiding the battery during insertion into the battery compartment. During operation of the chainsaw, the battery is placed on the guide webs. Due to the vibrations of the tool during operation, undesired relative movements between the battery compartment and the battery can occur.

SUMMARY

The disclosure is based on the object to further develop a generic hand-held work apparatus in such a way that the battery is held firmly in the battery compartment.

This object is solved by a hand-held work apparatus as disclosed hereafter.

Furthermore, the disclosure is based on the object to specify a method for producing a ready-to-use state of a hand-held work apparatus, which makes it possible for the battery of the hand-held work apparatus to be firmly held in the battery compartment.

This object is solved by a method as disclosed hereafter.

The hand-held work apparatus comprises a position stabilisation device having at least one first and at least one second positioning element. The first positioning element is arranged on the battery compartment. The second positioning element is arranged on the battery compartment. The position stabilisation device has at least one first counter element on the first outer side of the battery and at least one second counter element on the second outer side of the battery. At least in the ready-to-use state of the work apparatus, the first positioning element corresponds to the first counter element. At least in the ready-to-use state of the work apparatus, the second positioning element corresponds to the second counter element. At least in the ready-to-use state of the work apparatus, both the positioning elements as well as the counter elements extend along the insertion direction. At least in the ready-to-use state of the work apparatus, the battery is arranged between the first positioning element and the second positioning element. In particular, the first positioning element is designed as a projecting rib. In particular, the second positioning element is designed as a projecting rib. In particular, the first positioning element and the first counter element engage into each other. In particular, the second positioning element and the second counter element engage into each other. The battery compartment has a first side wall, which is coupled to the first outer side of the battery. The battery compartment has a second side wall, which is coupled to the second outer side of the battery. The first side wall and the second side wall are connected to each other via a base wall. The first side wall has a first longitudinal end, and the second side wall has a second longitudinal end. The first longitudinal end and the second longitudinal end are each facing away from the base wall.

The work apparatus comprises a tension element. The first longitudinal end and the second longitudinal end are pressed to each other by means of the tension element. Therefore, the battery can be held firmly in the battery compartment between the first positioning element and the second positioning element. Simultaneously, the battery compartment can be produced in a simple manner. In particular, production of the two side walls and the base wall is possible as a battery compartment element in a casting process, in particular in an injection-moulding process, in particular in a plastic injection-moulding process. In particular, the battery compartment element can be easily demoulded in that its two longitudinal ends are subsequently pressed to each other by means of the tension element. During the demoulding, the two side walls can be oriented to each other, in particular in a V-shape, at an angle opening away from the base wall. Subsequently, in the ready-to-use state of the work apparatus, the two side walls can then run parallel to each other, or are oriented at an angle to each other, which opens to the base wall.

In particular, in the ready-to-use state of the work apparatus, the first positioning element has a front positioning element distance to the second positioning element measured perpendicular to the longitudinal central plane of the battery, in relation to the insertion direction. In the ready-to-use state of the work apparatus, the first positioning element has a back positioning element distance to the second positioning element measured perpendicular to the longitudinal central plane of the battery, in relation to the insertion direction. The longitudinal central plane of the battery runs between the first outer side of the battery and the second outer side of the battery in the ready-to-use state of the work apparatus in the insertion direction. In particular, the longitudinal central plane of the battery separates the first outer side from the second outer side. In particular, the back positioning element distance is at most as large as the front positioning element distance. Therefore, the battery can be held firmly in the battery compartment between the first positioning element and the second positioning element. In the region in which the front positioning element distance is measured, there is not a larger distance between the first and the second positioning elements than in the region in which the front positioning element distance is measured, in contrast to work apparatus from the prior art. Therefore, the battery can also be held, in particular clamped, in particular guided, in the region of the front positioning element distance, close to the first and the second positioning elements.

In particular, the first positioning element is placed on the first counter element in the region, in which the back positioning element distance is measured, in the ready-to-use state of the work apparatus. In particular, the second positioning element is placed on the second counter element in the region, in which the back positioning element distance is measured, in the ready-to-use state of the work apparatus. In particular, a distance between the first counter element and the second counter element of the battery, measured in the ready-to-use state of the work apparatus, perpendicular to the longitudinal central plane of the battery, in the region, in which the front positioning element distance is measured, is the same size as a distance between the first counter element and the second counter element of the battery, measured in the ready-to-use state of the work apparatus, perpendicular to the longitudinal central plane, in the region, in which the back positioning element distance is measured. In particular, the distance from the first counter element to the second counter element is constantly the same size in the ready-to-use state in relation to the insertion direction. In particular, the counter elements do not have to run diagonally to each other. The battery can therefore be introduced into the battery compartment in a simple manner. As the distances of the counter elements and the positioning element are the same size in the region of the front and the back positioning element distance, installation of the counter elements on the positioning elements is achieved in a particularly simple manner. If the distance between the positioning elements and the corresponding counter elements is different in the region of the front and the back positioning element distance, the counter elements would have to be essentially wedge-shaped. The positioning elements would have to have a similar wedge shape. In this case, there would be the risk that the wedge shapes would be slightly different and therefore the battery could not be introduced so far into the battery compartment that it would be placed both in the region of the front as well as in the region of the back positioning element distance having its counter elements on the positioning elements of the battery compartment. The fact that in the ready-to-use state, the two longitudinal ends are pressed to each other by means of the tension element, in particular means that the distance between the first counter element and the second counter element of the battery in the region, in which the front positioning element distance is measured, is the same size as the distance between the first counter element and the second counter element of the battery in the region, in which the back positioning element distance is measured, enables the battery to be closely guided in the battery compartment. The tendency of the battery to be jammed in the battery compartment is lower.

Battery compartments from the prior art, and in particular their guide webs, have a larger distance to each other based in the back region in relation to the insertion direction of the battery than in the front region in relation to the insertion direction of the battery, due to the demoulding slope required for easy demoulding. This results in an interaction between the battery and the battery compartment, in particular between the positioning element and the associated counter element, in the back region of the battery compartments from the prior art. The two counter elements of the battery both run parallel to each other or in the insertion direction, in the prior art. Therefore, the distance of the counter elements to the positioning elements is larger in the back region in relation to the insertion direction than in the front region, in which the contact elements are placed on the counter elements. Due to the resulting interaction of a battery inserted into the battery compartment, i.e. when in the ready-to-use state of the work apparatus, relative movements can occur between the battery and the battery compartment.

Such relative movements can be avoided as a result of the fact that the two longitudinal ends are pressed to each other by means of the tension element, in particular that the back positioning element distance is at most as large as the front positioning element distance.

In particular, the work apparatus comprises a housing. In particular, the tension element is formed by the housing. Therefore, the tension element is formed in a space-saving and material-saving manner. This is efficient and cost-saving. In particular, the side walls of the battery compartment can be formed in the region between the two longitudinal ends of the battery compartment element by the housing of the work apparatus.

In particular, the housing comprises two housing halves. Therefore, the housing can be produced, in particular demoulded, in a simple manner. In particular, the tension element is formed by at least one of the two housing halves. In particular, a tension element is formed by each of the two housing halves. A housing half is also referred to as a housing shell.

In particular, the battery compartment element, in particular in the ready-to-use state of the tool, is at least partially arranged in the housing. In particular, the battery compartment element is delimited by the housing in the region between the first side wall and the second side wall.

In particular, the work apparatus has a first state, in which it is not ready-to-use. In the first state, the work apparatus is not yet fully assembled, or the battery compartment is not yet placed on the battery, such that the work apparatus is ready-to-use. Advantageously, the work apparatus is designed so that a first longitudinal end of the first side wall, facing away from the base wall, and a second longitudinal end of the second side wall, facing away from the base wall, converge to each other with the transition of the work apparatus from the first state into the ready-to-use state. In particular, after the first longitudinal end and the second longitudinal end converge to each other, further steps may be required in order to transition the work apparatus into the ready-to-use state. In each case, the first longitudinal end of the first side wall converges to the second longitudinal end of the second side wall in transit to the ready-to-use state. In particular, convergence occurs such that the back positioning element distance is at most as large as the front positioning element distance. The fact the first longitudinal end of the first side wall and the second longitudinal end of the second side wall converge to each other with the transition of the work apparatus from the first state into the ready-to-use state, means that the battery compartment can be produced so that a demoulding slope is designed with the production between the first positioning element and the second positioning element. The demoulding slope designed as such can be eliminated after demoulding the battery compartment by converging the first side wall and the second side wall. In particular, the first longitudinal end and the second longitudinal end converge on the way during the transition of the work apparatus into the ready-to-use state, so that the back positioning element distance is at most as large as the front positioning element distance. In particular, the work apparatus is designed so that with convergence of the first longitudinal end and the second longitudinal end to each other, convergence of the first positioning element and the second positioning element to each other also takes place.

In the ready-to-use state of the work apparatus, the battery has a battery length measured in the insertion direction. In particular, in the ready-to-use state of the work apparatus, the front positioning element distance is spaced apart from the back positioning element distance in the insertion direction by at least 20%, in particular by at least 30% of the battery length. Therefore, the battery can be held by the positioning elements over a majority of its battery length. The battery can be held firmly by positioning elements due to the large distance of the positioning element distances to each other in the insertion direction.

In particular, the first positioning element is a component of the first side wall with the same material. In particular, the second positioning element is a component of second side wall with the same material. In particular, the first side wall and the second side wall of the battery compartment are connected to each other via the base wall in the same material, in particular integrally, in particular monolithically. In particular, the first side wall alongside the first positioning element, the second side wall alongside the second positioning element, and the base wall are produced together in a casting process, in particular in an injection-moulding process, in particular in a plastic injection-moulding process. The assembly of a first side wall, second side wall and base wall is also referred to as a battery compartment element. In particular, the battery compartment element is an insert part. In particular, the battery compartment element is installed as an insert part into the work apparatus. In particular, the battery compartment element is produced separately from the rest of the work apparatus, in a separate casting process, in particular a separate injection-moulding process, in particular in a separate plastic injection-moulding process. In particular, the battery compartment element consists exclusively of the first side wall, the second side wall and the base wall. The fact that the battery compartment element is produced separately from the rest of the work apparatus in a separate casting process, in particular injection-moulding process, in particular plastic injection-moulding process, means that the battery compartment can be produced so that convergence of the first longitudinal end of the first side wall and the second longitudinal end of the second side wall to each other is possible during the transition of the work apparatus from the first state into the ready-to-use state. This convergence can occur during assembly of the work apparatus, in particular by the tension element, for example. In particular, during installation of the battery compartment into the work apparatus, the first longitudinal end can converge, in particular converge continuously, to the second longitudinal end. Simultaneously, it is possible to design the mould for the battery compartment so that a substantially wedge-shaped demoulding slope is formed between the first side wall and the second side wall. Therefore, simple demoulding of the battery compartment is possible after casting.

In an advantageous further development, in the ready-to-use state of the work apparatus, the first positioning element has two side flanges, opposing each other in the direction perpendicular to the insertion direction and in the direction of the longitudinal central plane. In particular, the side flanges are designed so that demoulding the battery compartment is possible during production of the battery compartment. In particular, a flange distance of the two side flanges, measured in the direction parallel to the longitudinal central plane and perpendicular to the insertion direction, is chosen in the direction perpendicular to the longitudinal central plane, so that demoulding of the battery compartment is possible in production of the battery compartment. In particular, the flange distance becomes smaller in the direction perpendicular to the longitudinal central plane.

The battery compartment element has a demoulding state. The demoulding state of the battery compartment element corresponds to the undeformed state of the battery compartment element. The demoulding state of the battery compartment element is in particular the state, in which the battery compartment element is removed from the injection mould.

In the ready-to-use state of the work apparatus, the battery compartment element is in a ready-to-use state. In particular, the battery compartment element has an intermediate state between the demoulding state and the ready-to-use state. This intermediate state is referred to as an open state of the battery compartment element. The open state and the demoulding state are combined under the term first state. The open state and/or the demoulding state are referred to as a first state.

In particular, the first side wall, in particular the first contact element, is oriented at an angle greater than 90° to the base in the first state. This angle is measured on an inner side of the battery compartment element, on which the positioning element is arranged. In particular, the second side wall, in particular the second contact element, is oriented at an angle greater than 90° relative to the base in the first state. This angle is also measured on the inner side of the battery compartment element, on which the positioning element is arranged. The fact that, in the ready-to-use state, the flange distance decreases in the direction perpendicular to the longitudinal central plane and to the longitudinal central plane, in the first state, the side flanges run towards each other in the direction counter to the insertion direction, in particular in a plane parallel to the longitudinal central plane. Therefore, the side flanges form a demoulding slope in the first state. The demoulding direction, in particular of the battery compartment element, runs in particular in the direction counter to the insertion direction.

In a particular embodiment, the first longitudinal end of the first side wall and the second longitudinal end of the second side wall converge to each other in the transition of the work apparatus from the first state into the ready-to-use state, so that the battery is clamped between the first side wall and the second side wall, in particular between the first positioning element and the second positioning element. Therefore, the battery is held firmly in the battery compartment between the first side wall and the second side wall. In particular, the clamping of the battery between the first side wall and the second side wall can be detached. Expediently, the first side wall and the second side wall can be removed from each other to remove the battery from the battery compartment. In particular, this applies to the first positioning element and the second positioning element. In particular, the battery is inserted into the battery compartment before reaching the ready-to-use state of the work apparatus, by converging the first side wall and the second side wall to each other, in particular by converging the first positioning element and the second positioning element to each other. In particular, the battery is clamped by converging the first side wall and the second side wall to each other, in particular by converging the first positioning element and the second positioning element to each other. In an alternative embodiment, it may however be provided that the battery is introduced into the battery compartment only after completely converging the first side wall and the second side wall to each other, in particular after converging the first positioning element and the second positioning element to each other.

In the ready-to-use state of the work apparatus, the back positioning element distance is measured at a back height in relation to the insertion direction. The back positioning element distance is measured in particular in the direction perpendicular to the longitudinal central plane. In particular, in the first state of the work apparatus, the first positioning element has a back first distance to the second positioning element, measured perpendicular to the longitudinal central plane in relation to the insertion direction at a back height, in particular at the same point as the back positioning element distance. In particular, the back first distance is measured at an unchanged position of the battery in relation to the tool, in comparison to the ready-to-use state of the work apparatus. In particular, the back height is a defined point of the battery, in particular in relation to the insertion direction. In particular, the back first distance is greater than the back positioning element distance. Then, the distance between the first positioning element and the second positioning element is reduced during transition of the work apparatus from the first state into the ready-to-use state. In particular, this can occur once during assembly of the work apparatus. However, it can also be provided that this reduction of the distance occurs again with each renewed insertion of the battery into the battery compartment. Similarly, it can be provided that both a reduction of the distance during assembly as well as a further reduction of the distance of the two positioning elements during each insertion of the battery into the battery compartment occurs.

In an advantageous further development, the work apparatus comprises a cover for the battery compartment. The cover is in particular pivotably mounted around a pivot axis. In particular, the cover is pivotably mounted on the battery compartment. In particular, the cover is pivotably mounted on the battery compartment element. In the first state, the cover is opened. In the ready-to-use state, the cover is closed. The work apparatus is designed, in particular, so that the cover moves the second longitudinal end of the second side wall to the pivot axis during the transition from the first state of the work apparatus to the ready-to-use state of the work apparatus. In particular, the cover is mounted on sides of the first side wall on the battery compartment. The fact that the cover moves the second longitudinal end of the second side wall to the pivot axis during the transition from the first state of the work apparatus to the ready-to-use state of the work apparatus, means that the first longitudinal end and the second longitudinal end can converge to each other in a simple and convenient manner. The convergence of the second longitudinal end of the second side wall to the first longitudinal end of the first side wall occurs alongside the transition of the cover into the closed state. In particular, the cover guides the second longitudinal end of the second side wall into the position which it adopts in the ready-to-use state of the work apparatus.

In particular, the work apparatus is designed so that the cover, when opened, enables the second longitudinal end to be removed from the first longitudinal end in such a way that the battery can be removed. In particular, removal of the first longitudinal end and the second longitudinal end from each other takes place due to pre-tensioning of the battery compartment element.

According to the method for producing a ready-to-use state of a hand-held work apparatus, the first longitudinal end and the second longitudinal end converge to each other during the transition into the ready-to-use state of the work apparatus. In this case, it may also only be a partial step on the way into the ready-to-use state of the work apparatus. This partial step is required in order to reach the ready-to-use state. It can nevertheless be provided that further steps are required in order to reach the ready-to-use state. In this case, the first longitudinal end and the second longitudinal end converge to each other, so that at least one partial region of the first positioning element converges to at least one partial region of the second positioning element. In particular, the first positioning element and the second positioning element converge to each other in such a way that the back positioning element distance is at most as large as the front positioning element distance.

In particular, the first longitudinal end and the second longitudinal end converge to each other during the assembly of the work apparatus, in particular so that the back positioning element distance is at most as large as the front positioning element distance. As described above, this allows the battery to be held securely in the battery compartment while the battery compartment is at the same time easy to demould. In particular, the battery still has to be inserted into the battery compartment after the longitudinal ends converge to each other to achieve the ready-to-use state of the work apparatus.

Alternatively to the convergence during the assembly, it can be provided that the battery is arranged between the first side wall and the second side wall, while the first longitudinal end and the second longitudinal end converge to each other. In particular, the first longitudinal end and the second longitudinal end converge to each other so far here that the battery is clamped between the first longitudinal end and the second longitudinal end, in particular between the first positioning element and the second positioning element. In this manner, the battery can be arranged in the battery compartment in a convenient manner and subsequently held firmly in the battery compartment by clamping. In particular, it is provided that the first longitudinal end is in turn away from the second longitudinal end for removing the battery, so that the battery is released. The battery is then no longer held clamped between the first longitudinal end and the second longitudinal end. The battery can then be removed from the battery compartment in a convenient manner.

In an advantageous further development, the first longitudinal end and the second longitudinal end converge to each other both during the assembly of the work apparatus as well as when inserting the battery into the battery compartment. In particular, during the assembly of the work apparatus, the first longitudinal end and the second longitudinal end converge to each other in an open state of the battery compartment. In particular, in a clamped state of the battery compartment, the first longitudinal end and the second longitudinal end converge even further to each other than in the open state of the battery compartment in order to subsequently clamp the battery and to transition into the ready-to-use state of the work apparatus. Therefore, the battery compartment is already pre-tensioned in the open state. Therefore, the side walls of the battery compartment move in a defined region. Due to the pre-tensioning of the battery compartment in the open state, the spring action caused by the deformation of the battery compartment is both defined and large. If the second side wall is not held in the position in which it is in the operating state of the work apparatus, it springs back into the open state on its own. This means that components can be reduced, and the work apparatus is easy to manufacture.

Exemplary embodiments of the invention are explained in more detail below by reference to the drawing.

DETAILED DESCRIPTION

The exemplary embodiments show a hand-held work apparatus 1. In the exemplary embodiments, the hand-held work apparatus 1 is an electric hedge trimmer. However, the hand-held work apparatus can also be a chainsaw, an angle grinder, a brush cutter, an edge trimmer, a branch cutter, a blower, a sprayer, a suction device, an earth auger, a combination motor device for multifunctional purposes, a sweeper, a motor hook, a rotary tiller, a high-pressure cleaning device, a lawn mower, a scarifier, a shredder, a wet or dry vacuum cleaner or similar work apparatus.

Figure 1:
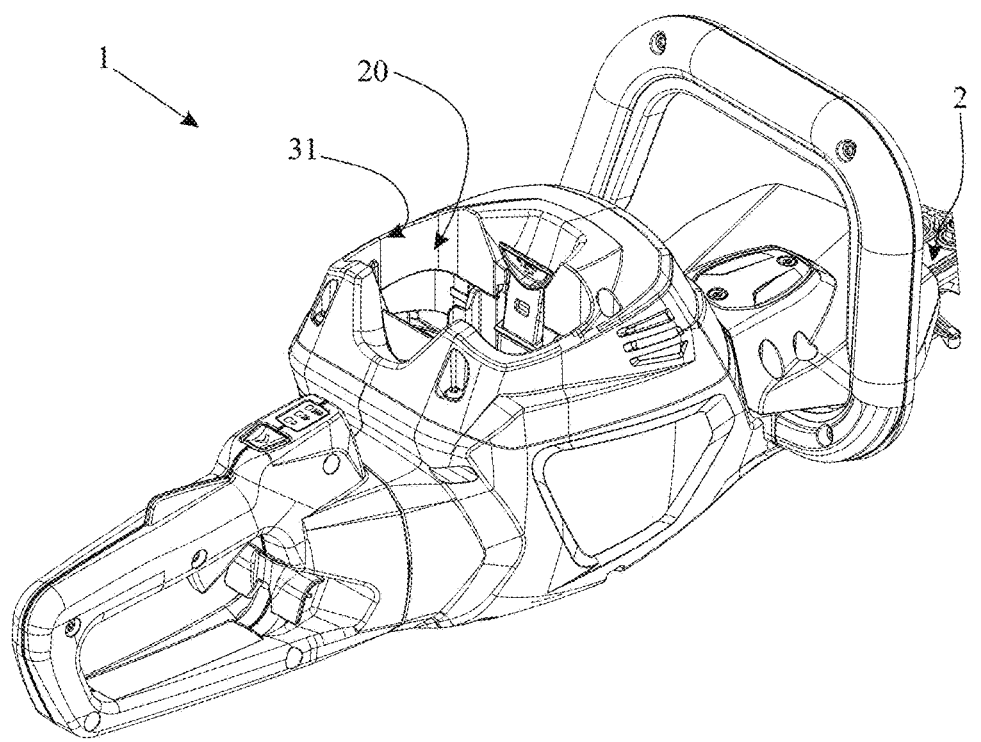
FIG. 1 shows a perspective illustration of a hand-held work apparatus having a battery compartment.

The hand-held work apparatus 1 comprises a tool 2, as illustrated in FIG. 1. In the exemplary embodiment, the tool 2 is a cutter bar having blades which can move against each other.

Figure 3:
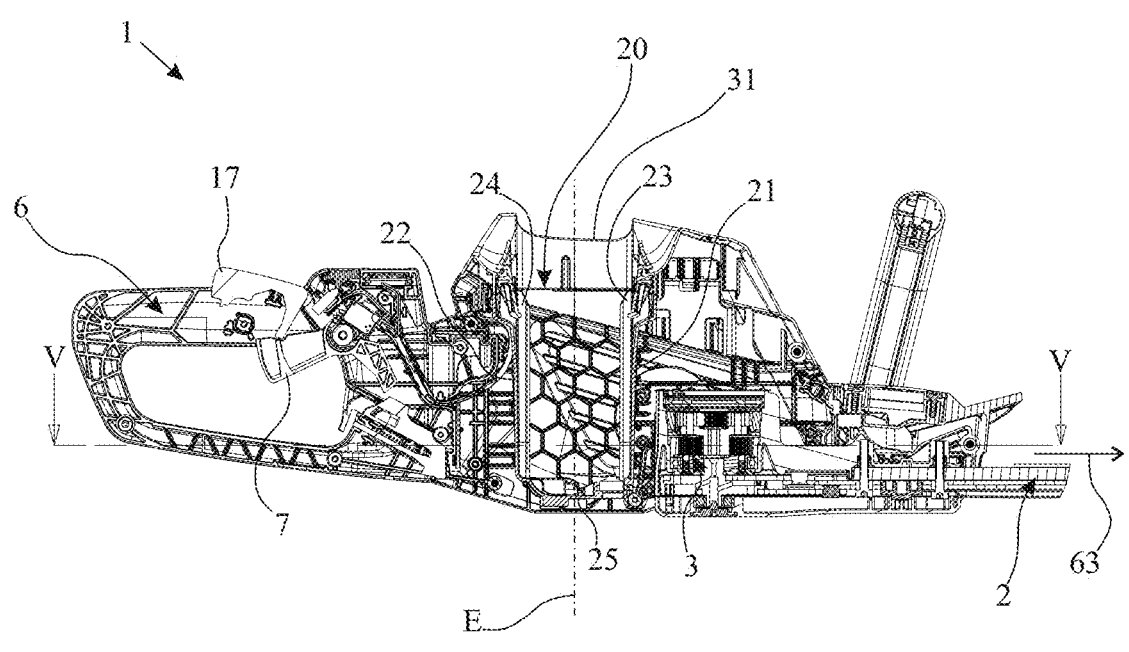
FIG. 3 shows a sectional illustration of a section through the work apparatus from FIGS. 1 and 2, along the section plane marked in FIG. 2 with III-III.

The hand-held work apparatus 1 has an electric motor 3 for driving the tool 2, as illustrated in FIG. 3. A battery 40 schematically illustrated in FIG. 4 with a dashed line is provided to supply energy to the electric motor 3.

Figure 4:
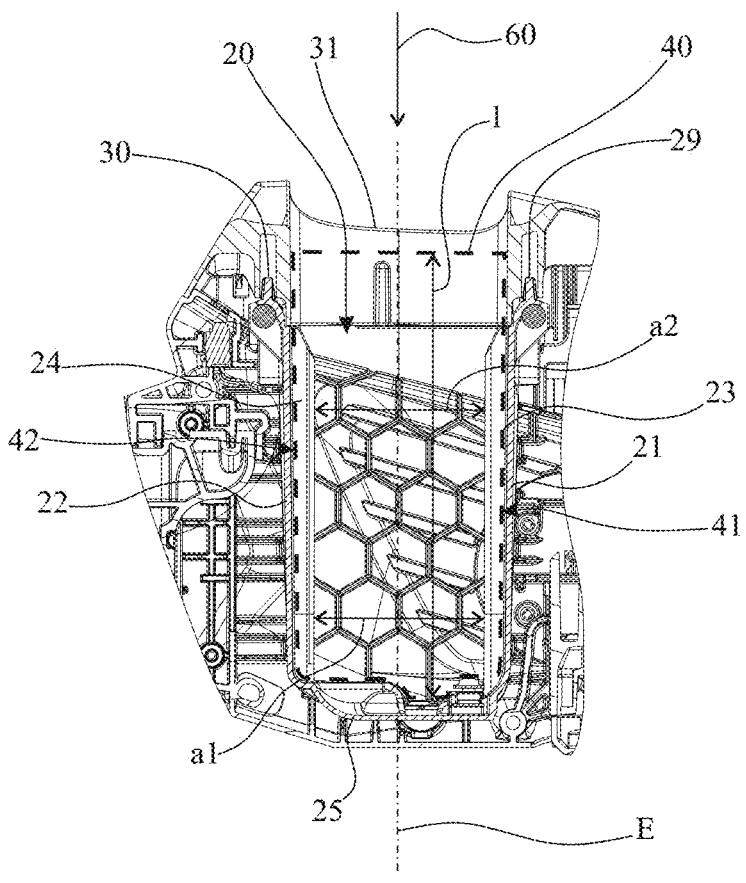
FIG. 4 shows an enlarged detailed illustration of a section through the work apparatus from FIGS. 1 and 2, along the section plane marked in FIG. 2 with IV-IV.

The hand-held work apparatus 1 comprises a battery compartment 20, as illustrated in FIG. 1. The battery compartment 20 serves to accommodate the battery 40. The battery compartment 20 has a circumferential insertion opening 31. The battery 40 can be inserted into the battery compartment 20 in an insertion direction 60, as illustrated in FIG. 4. The battery 40 can be inserted through the insertion opening 31 into the battery compartment 20. In the exemplary embodiment, an edge of the insertion opening 31 runs in a closed configuration around the insertion direction 60.

Figure 2:
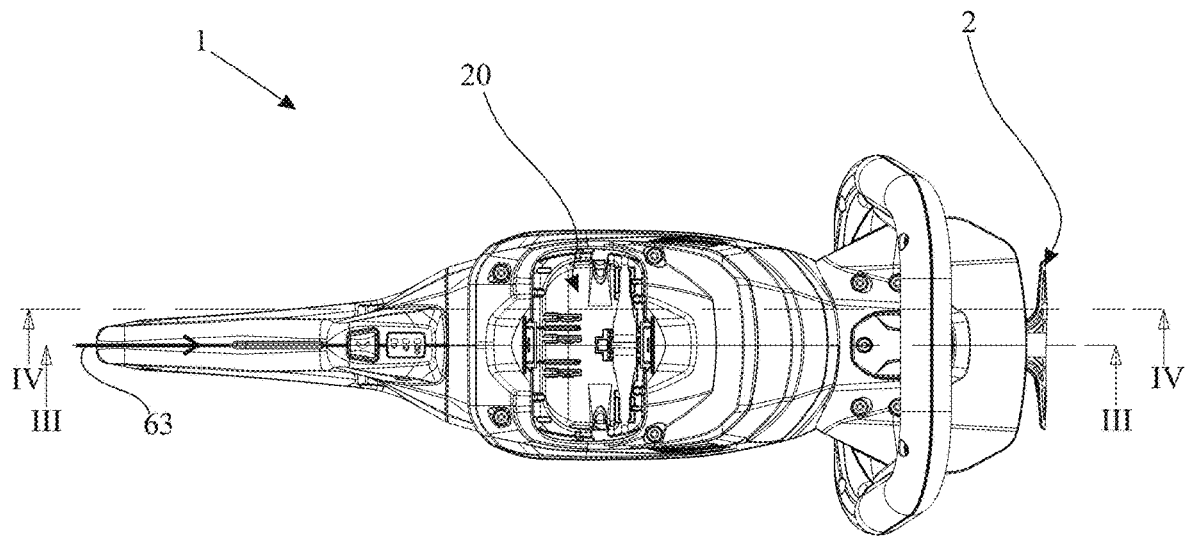
FIG. 2 shows a plan view from above of the hand-held work apparatus from FIG. 1.

As illustrated in FIG. 4, the battery 40 has a first outer side 41 and a second outer side 42. The first outer side 41 and the second outer side 42 are opposite each other. An imaginary longitudinal central plane E of the battery 40 runs between the first outer side 41 and the second outer side 42. In the exemplary embodiments, the longitudinal central plane E is arranged in the centre between the first outer side 41 of the battery 40 and the second outer side 42 of the battery 40. The first outer side 41 and the second outer side 42 each run perpendicular to the same line 64. The longitudinal central plane E is perpendicular to the line 64. In the ready-to-use state of the work apparatus 1, the battery 40 is inserted into the battery compartment 20 and can supply energy to the electric motor 3. The ready-to-use state of the work apparatus 1 is also referred to as an operational state of the work apparatus 1. In the ready-to-use state of the work apparatus 1, the work apparatus 1 can be put into operation by the operator by actuating corresponding operating elements. Further measures are not required, in order to put the work apparatus 1 in the ready-to-use state into operation. In the ready-to-use state of the work apparatus 1, the first outer side 41 of the battery 40 is facing towards the tool 2. In the exemplary embodiments, in the ready-to-use state of the work apparatus 1, the second outer side 42 of the battery 40 is facing away from the tool 2. In the ready-to-use state of the work apparatus 1, the longitudinal central plane E of the battery 40 extends in the insertion direction 60, in which the battery 40 can be introduced into the battery compartment 20. In the exemplary embodiment, in the ready-to-use state of the work apparatus 1, the longitudinal central plane E of the battery 40 separates the tool 2 from a back handle 6 of the work apparatus 1. The back handle 6 is illustrated in FIG. 3. An operating element 7 is arranged on the back handle 6. The operating element 7 serves to control the energy supply to the electric motor 3 by the operator. In the ready-to-use state of the work apparatus 1, the work apparatus 1 can be put into operation by, in particular only, actuating the operating element 7. In the exemplary embodiment it is provided that an unlocking element 17 has to be actuated before and/or simultaneously. The back handle 6 is facing towards the operator during operation of the work apparatus 1. The back handle 6 is arranged on a longitudinal end of the work apparatus 1. In the exemplary embodiment, the tool 2 is arranged on the longitudinal end of the work apparatus 1, opposite the back handle 6. In the exemplary embodiment, the battery compartment 20 is arranged between the back handle 6 and the tool 2. As marked in FIGS. 2 and 3, the work apparatus 1 extends along a longitudinal direction 63. In the ready-to-use state of the work apparatus 1, the longitudinal central plane E of the battery 40 runs transverse to the longitudinal direction 63 of the work apparatus 1. The longitudinal direction 63 runs in the movement direction of the blades of the cutter bar.

Figure 5:
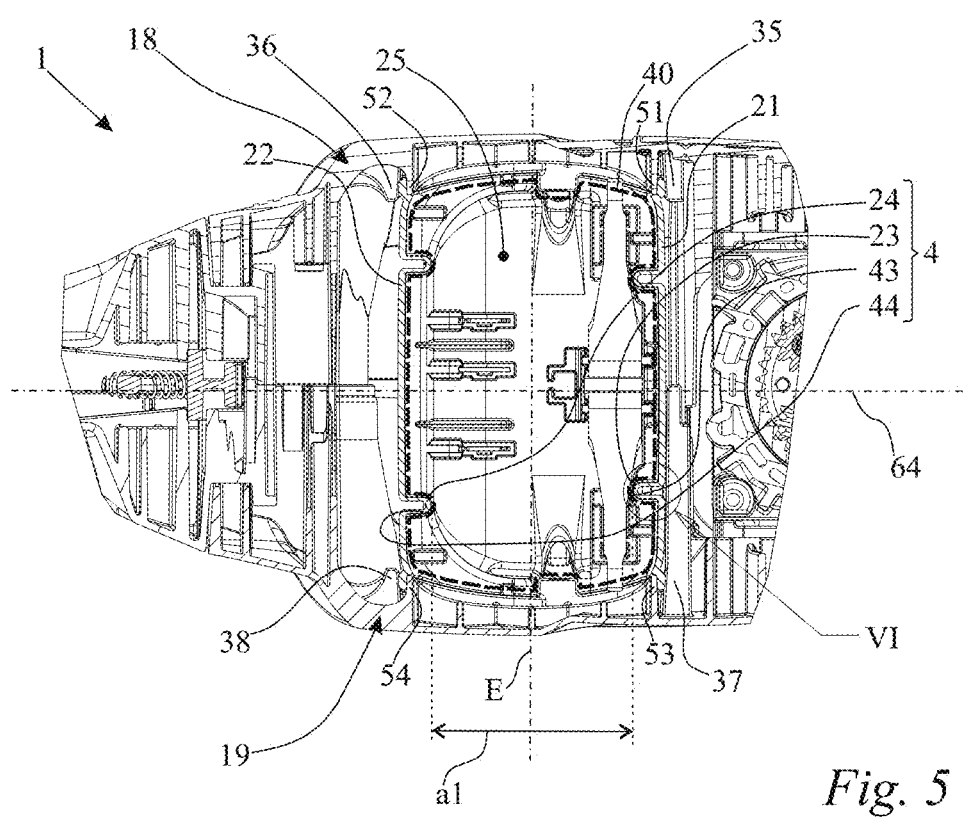
FIG. 5 shows a partial illustration of a section through the work apparatus from FIGS. 1 and 2, along the section plane marked in FIG. 3 with V-V.

The work apparatus 1 comprises a position stabilisation device 4, as illustrated in FIG. 5. The position stabilisation device 4 serves to stabilise the position of the battery 40 in the battery compartment 20. The position stabilisation device 4 serves to reduce and/or suppress relative movements between the battery 40 and the battery compartment 20. The position stabilisation device 4 comprises at least one first positioning element 23 and a second positioning element 24. The first positioning element 23 is arranged, in particular formed, on the battery compartment 20. The second positioning element 24 is arranged, in particular formed, on the battery compartment 20. The position stabilisation device 4 comprises at least one first counter element 43. The position stabilisation device 4 comprises at least one second counter element 44. The first counter element 43 is arranged, in particular formed, on, in particular in, the first outer side 41 of the battery 40. The second counter element 44 is arranged, in particular formed, on, in particular in, the second outer side 42 of the battery 40. The first outer side 41 is an exterior surface of the battery 40. The second outer side 42 of the battery 40 is an exterior surface of the battery 40. In the ready-to-use state of the work apparatus 1, the first positioning element 23 corresponds to the first counter element 43. In the ready-to-use state of the work apparatus 1, the second positioning element 24 corresponds to the second counter element 44. In particular, in the ready-to-use state of the work apparatus 1, the battery 40 is placed with the first counter element 43 on the first positioning element 23 of the battery compartment 20. In particular, in the ready-to-use state of the work apparatus 1, the battery 40 is placed with the second counter element 44 on the second positioning element 24 of the battery compartment 20. In the exemplary embodiments, the first positioning element 23 of the battery compartment 20 is a projecting rib. In the exemplary embodiments, the second positioning element 24 of the battery compartment 20 is a projecting rib. However, it can also be provided that the first and/or the second positioning element are each formed by at least two projections, designed separately from each other. In this case, the first and/or the second positioning element also extends along the insertion direction 60. This means in this case that the at least two projections are placed behind each other on a common straight line in the insertion direction 60. In the exemplary embodiment according to FIG. 20, the first positioning element 23 has a back projection region 55. The first positioning element 23 has a front projection region 56. In the ready-to-use state, the back projection region 55 is arranged in the region, in which the back positioning element distance a2 is measured. In the ready-to-use state, the front projection region 56 is arranged in the region, in which the front positioning element distance a1 is measured. The front projection region 56 is spaced apart from the back projection region 55 in the insertion direction 60, in particular in the ready-to-use state of the battery compartment element. The front projection region 56 is in front of the back projection region 55 in relation to the insertion direction 60. In the exemplary embodiment, the back projection region 55 and the front projection region 56 are placed behind each other in an imaginary straight line. In the exemplary embodiment, a recess of the first positioning element 23 is designed between the back projection region 55 and the front projection region 56. It can also be provided that the front projection region 56 and the back projection region 55 are separate projections. In this case, a projection is not provided between the two projection regions 55 and 56. In the exemplary embodiment, protrusions are formed by the back projection region 55 and the front projection region 56. In the ready-to-use state, the first holder element 23 has a wave shape in a sectional illustration of a section having a section plane running perpendicular to the longitudinal central plane E and parallel to the insertion direction 60. The projection regions 55 and 56 serve to transmit force from the battery compartment element to the battery 40 at defined points. Target-specific transmission and as wide a distribution of the clamping force as possible from the battery compartment element to the battery 40 are possible due to the projection regions 55 and 56. In the exemplary embodiment, in particular in the ready-to-use state, the back projection region 55 is designed to transmit the force in the region of a focal point of the battery 40, in relation to the insertion direction 60. In the exemplary embodiment, in particular in the ready-to-use state, the front projection region 56 is designed to transmit the force in the region of electrical contacts of the battery 40, in relation to the insertion direction 60. The electric contacts serve to transmit electrical energy from the battery 40 to the remaining part of the work apparatus 1. The front projection region 56 is designed so that the battery 40 is closely guided in this region. The back projection region 55 is designed so that the battery 40 is held in the ready-to-use state in this region with a large clamping force.

In the ready-to-use state, the region of the first holder element 23, arranged between the back projection region 55 and the front projection region 56 in relation to the insertion direction 60, represents a back section. Nevertheless, the battery compartment element can be produced in a casting process, in particular in an injection-moulding process, in particular in a plastic injection-moulding process, as the back section only emerges through the subsequent deformation of the battery compartment element. In the undeformed state of the battery compartment element, there is no back section in relation to the insertion direction 60 and the battery compartment element can be demoulded easily.

Figure 20:
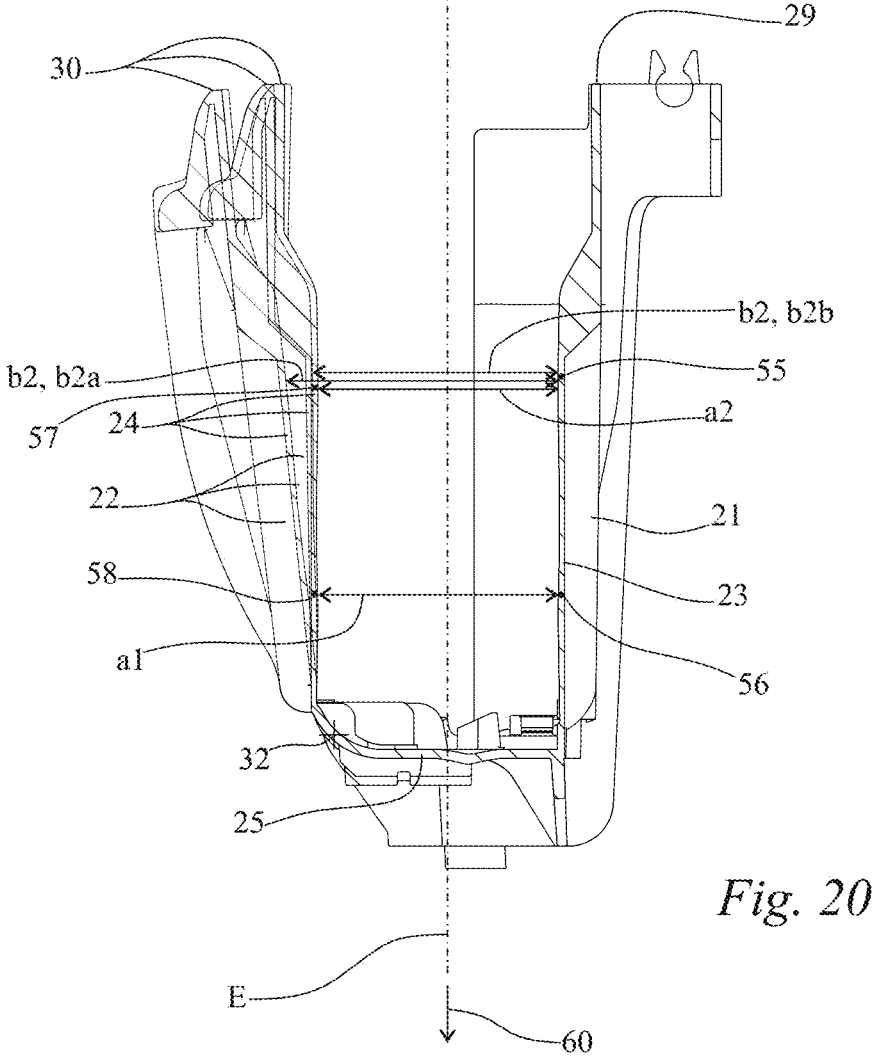
FIG. 20 shows a sectional side view of the battery compartment element from FIG. 14 without a cover in three different states: in a demoulding state, in an open state and an operating state.

As illustrated in FIG. 20, the second contact element 24 also has a front projection region 58 and a back projection region 57. The above description of the front projection region 56 of the first contact element 23 and the back projection region 55 of the first contact element 23 applies in an analogous manner to the back projection region 57 of the second contact element 24 and the front projection region 58 of the second contact element 24. In the ready-to-use state, the battery 40 is clamped between the back projection region 55 of the first contact element 23 and the back projection region 57 of the second contact element 24. The battery 40 is closely guided, in particular by the engagement of the front projection regions 56 and 58, into the first counter element 43 or the second counter element 44 of the battery 40, by means of the front projection region 56 of the first contact element 23 and the front projection region 58 of the second contact element 24.

In the exemplary embodiments, the first counter element 43 of the battery 40 is a groove. In the exemplary embodiments, the second counter element 44 of the battery 40 is a groove. In the ready-to-use state of the work apparatus 1, the first counter element 43 of the battery 40 engages into the first positioning element 23 of the battery compartment 20. In the ready-to-use state of the work apparatus 1, the second counter element 44 of the battery 40 engages into the second positioning element 23 of the battery compartment 20. In the exemplary embodiments according to FIGS. 1 to 13, the first positioning element 23 and the second positioning element 24 guide the battery 40 during insertion of the battery 40 into the battery compartment 20.

In the ready-to-use state of the work apparatus 1, the first positioning element 23, the second positioning element 24, the first counter element 43 and the second counter element 44 extend along the insertion direction 60. In the ready-to-use state of the work apparatus 1, the battery 40 is arranged between the first positioning element 23 and the second positioning element 24. As illustrated in FIG. 4, in the ready-to-use state of the work apparatus 1, the first positioning element 23 has a front positioning element distance a1 to the second positioning element 24 measured perpendicular to the longitudinal central plane E, in relation to the insertion direction 60. In the ready-to-use state of the work apparatus 1, the first positioning element 23 has a back positioning element distance a2 to the second positioning element 24 measured perpendicular to the longitudinal central plane E, in relation to the insertion direction 60. The back positioning element distance a2 is measured closer to the insertion opening 31 of the battery compartment 20 than the front positioning element distance a1. In the exemplary embodiments, the back positioning element distance a2 is at most as large as the front positioning element distance a1. In particular, the front positioning element distance a1 is greater than the back positioning element distance a2. In the exemplary embodiment, the back positioning element distance a2 is exactly as large as the front positioning element distance a1. It can also be provided that the back positioning element distance a2 is 95% to 100%, in particular 98% to 100%, in particular 99.5% to 100% of the front positioning element distance a1. In an alternative embodiment, it can also be provided that the back positioning element distance a2 is greater than the front positioning element distance a1.

The battery 40 has a battery length l (FIG. 4). The battery length l is measured in the ready-to-use state of the work apparatus 1, in the insertion direction 60. The front positioning element distance a1 is spaced apart from the back positioning element distance a2 by at least 20%, in particular by at least 30% of the battery length l. In other words, in the ready-to-use state of the work apparatus 1, the measuring points in the longitudinal central plane E, in which in each case the front positioning element distance a1 and the back positioning element distance a2 are measured, possess a measuring point distance to each other, measured in the insertion direction 60, which is at least 20%, in particular at least 30% of the battery length l. The front positioning element distance a1 is spaced apart from the back positioning element distance a2 in the insertion direction 60, by at most 90%, in particular by at most 80% of the battery length l. The measuring point distance is at most 90%, in particular at most 80% of the battery length l, in the insertion direction 60.

Figure 7:
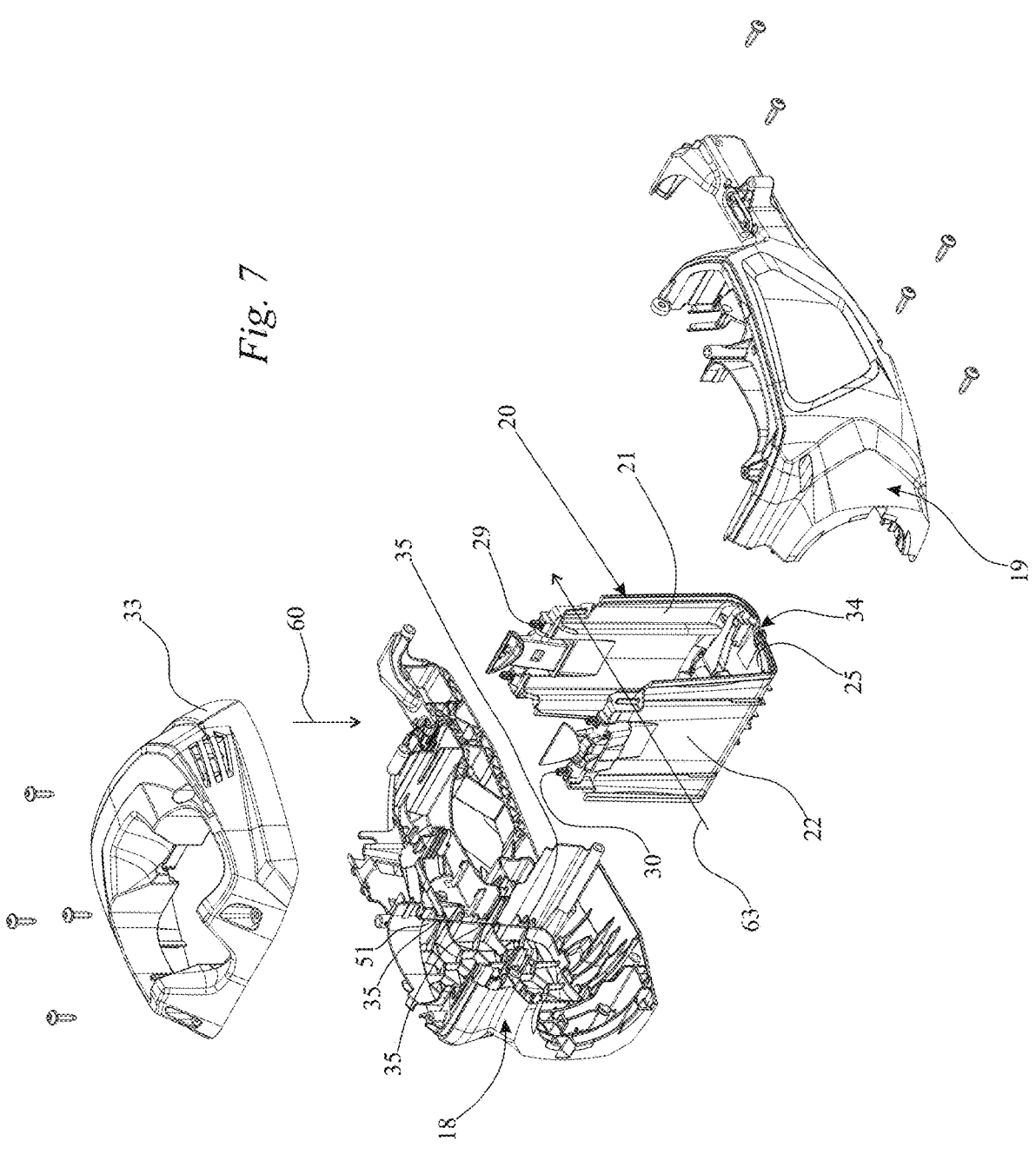
FIG. 7 shows an exploded view of individual components of the work apparatus from FIGS. 1 and 2.

As illustrated in particular in FIG. 7, the battery compartment 20 has a first side wall 21. The battery compartment 20 has a second side wall 22. In the exemplary embodiment, the first side wall 21 and the second side wall 22 of the battery compartment 20 are placed opposite each other. The first side wall 21 and the second side wall 22 are placed opposite each other in relation to the longitudinal direction 63 of the work apparatus 1. The first side wall 21 and the second side wall 22 are connected to each other via a base wall 25 in the same material, in particular integrally, in particular monolithically. The first side wall 21, the second side wall 22 and the base wall 25 are produced together in a casting process, in particular in an injection-moulding process, in the exemplary embodiments in a plastic injection-moulding process. The assembly consisting of a first side wall 21, second side wall 22 and base wall 25 is referred to as a battery compartment element. The battery compartment element is produced in a single casting process step, in particular in a single injection-moulding process step, in the exemplary embodiment in a single plastic injection-moulding process step.

In the ready-to-use state of the work apparatus 1, the first side wall 21 is facing towards the tool 2, as illustrated in FIG. 3. In the ready-to-use state of the work apparatus 1, the second side wall 22 is facing away from the tool 2. As can be seen in particular from FIG. 4, in the ready-to-use state of the work apparatus 1, the first side wall 21 of the battery compartment 20 is coupled to the first outer side 41 of the battery 40. In the ready-to-use state of the work apparatus 1, the second side wall 22 of the battery compartment 20 is coupled to the second outer side 42 of the battery 40.

Figure 12:
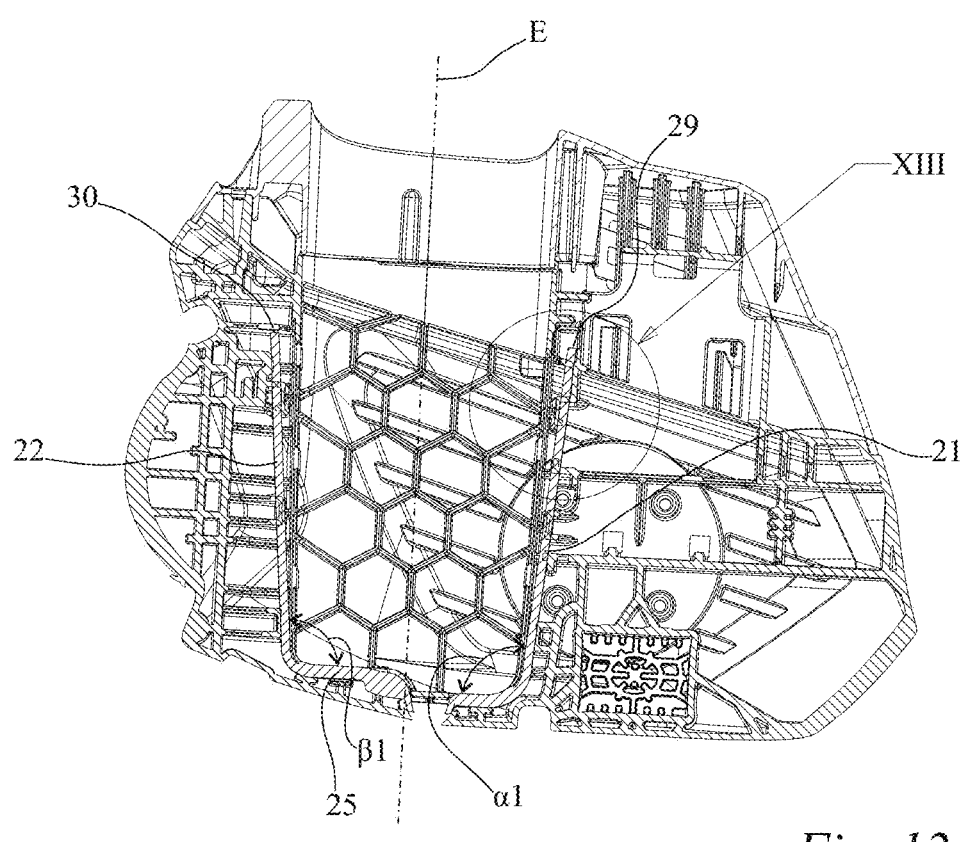
FIG. 12 shows the sectional illustration from FIG. 9, wherein the two side walls and the base of the battery compartment element are illustrated in the undeformed state, which the battery compartment element would have before assembly in the work apparatus.

As can be seen in particular from FIG. 7, the battery compartment element is substantially U-shaped or V-shaped, in a side view in the direction perpendicular to the longitudinal direction 63 of the work apparatus 1, and in the direction perpendicular to the insertion direction 60. FIG. 12 shows the battery compartment element in a demoulding state. The demoulding state of the battery compartment element corresponds to the undeformed state of the battery compartment element. The demoulding state of the battery compartment element is the state, in which the battery compartment element is removed from the injection mould.

Figure 9:
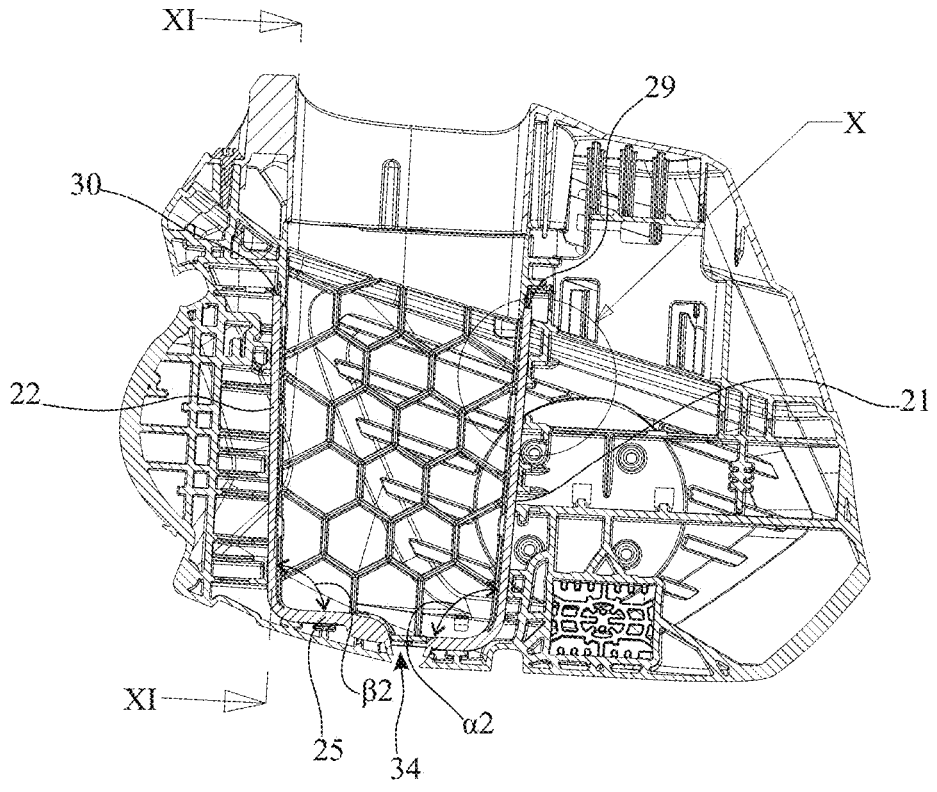
FIG. 9 shows a sectional illustration of a section through the components illustrated in FIG. 8 along the section plane marked in FIG. 11 with XII-XII, wherein the two side walls and the base of the battery compartment element are illustrated in the deformed state, in particular the ready-to-use state, which the battery compartment element has after assembly in the work apparatus.

In the ready-to-use state of the work apparatus 1, the battery compartment element is in a ready-to-use state. This state of the battery compartment element is illustrated in FIG. 9 for example, even if the work apparatus 1 is not in the ready-to-use state in FIG. 9, because the battery 40 has not been inserted into the battery compartment 20.

It can be provided that the battery compartment element has an intermediate state between the demoulding state and the ready-to-use state. This intermediate state is referred to as an open state of the battery compartment element and is illustrated in FIG. 20, for example. The open state and the demoulding state are combined under the term first state. The open state and/or the demoulding state is referred to as a first state.

In the first state of the battery compartment element, the first side wall 21 and the second side wall 22, in particular the first contact element 23 and the second contact element 24, run diagonally to each other. A distance, measured in the direction perpendicular to the longitudinal central plane E, between the first side wall 21 and the second side wall 22, in particular between the first contact element 23 and the second contact element 24, is greater in the direction away from the base wall 25. An angle α1, measured on the inner side of the battery compartment element between the first side wall 21 and the base wall 25, is at least 90°, in the exemplary embodiment more than 90° (FIG. 12). The angle α1 corresponds to the angle at which the first contact element 23 is oriented with respect to the base wall 25 in the first state. An angle β1, measured between the second side wall 22 and the base wall 25 on the inner side of the battery compartment element, is at least 90°, in the exemplary embodiment more than 90°. The angle β1 corresponds to the angle at which the second contact element 24 is oriented with respect to the base wall 25 in the first state. The angle α1 is less than 135°. The angle β1 is less than 135°. In the ready-to-use state, the base wall 25 runs, in particular, perpendicular to the longitudinal central plane E. An angle (not illustrated), opening in the direction against the insertion direction 60, between the first positioning element 23 and the insertion direction 60, in particular the longitudinal central plane E, is greater than 0°, in particular greater than 2°, in particular smaller than 30°, in the first state. An angle (not illustrated), opening in the direction against the insertion direction 60, between the second positioning element 24 and the insertion direction 60, in particular the longitudinal central plane E, is greater than 0°, in particular greater than 2°, in particular smaller than 30°, in the first state.

As illustrated in particular in FIG. 7, the first side wall 21 has a first longitudinal end 29. The second side wall 22 has a second longitudinal end 30. The first longitudinal end 29 is facing away from the base wall 25. The second longitudinal end 30 is facing away from the base wall 25. The first longitudinal end 29 is a free longitudinal end of the battery compartment element. The second longitudinal end 30 is a free longitudinal end of the battery compartment element.

As the comparison of FIGS. 9 and 12 shows, convergence of the first longitudinal end 29 and the second longitudinal end 30 to each other is possible originating from the first state of the battery compartment element (FIG. 12). FIG. 9 shows the battery compartment element in its ready-to-use state. If, in this ready-to-use state of the battery compartment element, the battery 40 has been completely inserted into the battery compartment 20, the work apparatus 1 is in its ready-to-use state. In the ready-to-use state of the battery compartment element, the first longitudinal end 29 and the second longitudinal end 30 are arranged at a smaller distance to each other than in the first state of the battery compartment element. In the ready-to-use state of the battery compartment element, the first side wall 21, in particular the first holder element 23, is oriented at an angle α2 to the base wall 25, on the inner side of the battery compartment element (FIG. 9). The angle α2 is smaller than the angle α1. In particular, the angle α2 is smaller than 90.5°. In the exemplary embodiment, the angle α2 is from 89.5° to 90.5°, in particular from 89.7° to 90.3°, in particular exactly 90°.

The angle (not illustrated), opening in the direction against the insertion direction 60, between the first positioning element 23 and the insertion direction 60, in particular the longitudinal central plane E, is greater in the first state, in particular at least 0.3° greater, in particular at least 0.5° greater, than in the ready-to-use state.

In the ready-to-use state of the battery compartment element, the second side wall 22, in particular the second holder element 24, is oriented towards the base wall 25 at an angle β2, measured on the inner side of the battery compartment element. The angle β2 is smaller than the angle β1. In particular, the angle β2 is smaller than 90.5°. In the exemplary embodiment, the angle β2 is from 89.5° to 90.5°, in particular from 89.7° to 90.3°, in particular exactly 90°. In particular, the angle β2 is smaller than 90°.

The angle (not illustrated), opening in the direction against the insertion direction 60, between the second positioning element 24 and the insertion direction 60, in particular the longitudinal central plane E, is greater in the first state, in particular at least 0.3° greater, in particular at least 0.5° greater, than in the ready-to-use state.

In the ready-to-use state of the battery compartment element, the longitudinal ends 30 and 29, in particular the holder elements 23 and 24, are bent towards each other in comparison to the first state of the battery compartment element. In the ready-to-use state of the battery compartment element, forces act on the first longitudinal end 29 and on the second longitudinal end 30, in the direction of an enlargement of the distance between the first longitudinal end 29 and the second longitudinal end 30. The two longitudinal ends 29 and 30, in particular the two holder element 23 and 24, are driven apart from one another in a spring-like manner. The reason for this is that, in the ready-to-use state of the battery compartment element, the longitudinal ends 29 and 30 are held at a smaller distance to each other than directly after demoulding the battery compartment element.

Figure 8:
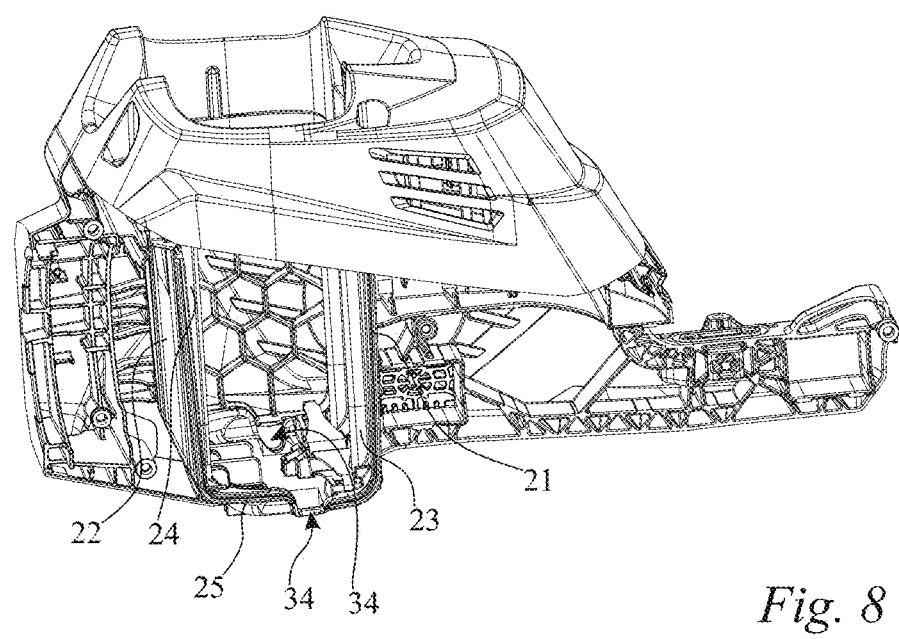
FIG. 8 shows a perspective illustration of the battery compartment of the work apparatus from FIGS. 1 and 2, wherein a component forming an outer wall of the battery compartment is missing for illustrative purposes.

As illustrated in particular in FIG. 8, the first positioning element 23 is a component of the first side wall 21 of the battery compartment 20, with the same material, in particular an integral, in particular monolithic, component. The second positioning element 23 is a component of the second side wall 22 of the battery compartment 20 with the same material, in particular an integral, in particular monolithic, component. The first positioning element 23 is produced with the first side wall 21 in the same casting process step, in particular in the same injection-moulding process step, in the exemplary embodiment in the same plastic injection-moulding process step. The second positioning element 24 is produced together with the second side wall 22 in the same casting process step, in particular in the same injection-moulding process step, in the exemplary embodiment in the same plastic injection-moulding process step. In the exemplary embodiment, the first positioning element 23 is a projection of the first side wall 21. In the exemplary embodiment, the second positioning element 24 is a projection of the second side wall 22. The first positioning element 23 and the second positioning element 24 are facing towards each other, Originating from the first state of the work apparatus 1, illustrated in FIG. 12, the longitudinal ends 29 and 30 of the battery compartment element converge to each other for transition into the ready-to-use state of the work apparatus 1. FIG. 9 shows the ready-to-use state of the battery compartment element. With the convergence of the longitudinal ends 29 and 30 to each other, partial regions of the first positioning element 23 and the second positioning element 24 also converge to each other. In the exemplary embodiment, this occurs so that the back positioning element section a2 is at most as large as the front positioning element distance a1.

In all exemplary embodiments, the work apparatus 1 comprises a tension element. The first longitudinal end 30 and the second longitudinal end 31 are pressed onto each other by means of the tension element. The distance between the first longitudinal end 30 and the second longitudinal end 31 is reduced by the tension element, in particular continuously reduced. In the exemplary embodiment according to FIGS. 1 to 13, the tension element keeps the battery compartment element in the ready-to-use state. The work apparatus 1 is in the ready-to-use state, with the battery 40 inserted, due to the tension element. In the exemplary embodiment according to FIGS. 14 to 20, the tension element keeps the battery compartment element in the open state. In particular, the tension element prevents the battery compartment element from assuming the demoulding state. The tension element forms an abutment for the battery compartment element, in particular for the second longitudinal end 30. From the ready-to-use state, the second longitudinal end 30 can be moved away from the first longitudinal end 29 until the work apparatus 1, in particular the battery compartment element, is in the open state. The second longitudinal end 30 then strikes the tension element. The first longitudinal end 29 is placed on the tension element for this purpose, both in the ready-to-use state as well as in the open state. In the open state, the tension element clamps the first longitudinal end 29 and the second longitudinal end 30 together, so that, in contrast to the demoulding state, they move to each other, in particular are pressed onto each other.

In the first state of the work apparatus 1, illustrated in FIG. 12, the work apparatus 1 is not yet fully assembled. The work apparatus 1 is not ready-to-use in the first state of the work apparatus 1. During assembly of the work apparatus 1, i.e. during the transition of the work apparatus 1, in particular of the battery compartment element, from the first state, in particular the demoulding state, into the ready-to-use state, the first longitudinal end 29 of the first side wall 21 and the second longitudinal end 30 of the second side wall 22 converge to each other. With the transition of the work apparatus 1 from the first state into the ready-to-use state, in this case the process of the transition is referred to and not the state achieved at the end of this process. It may be necessary that further transition steps are required for achieving the final ready-to-use state. For this purpose, for example, the insertion of the battery 40 can be included. However, yet further convergence of the longitudinal ends 29 and 30 to each other may also be required.

Figure 6:
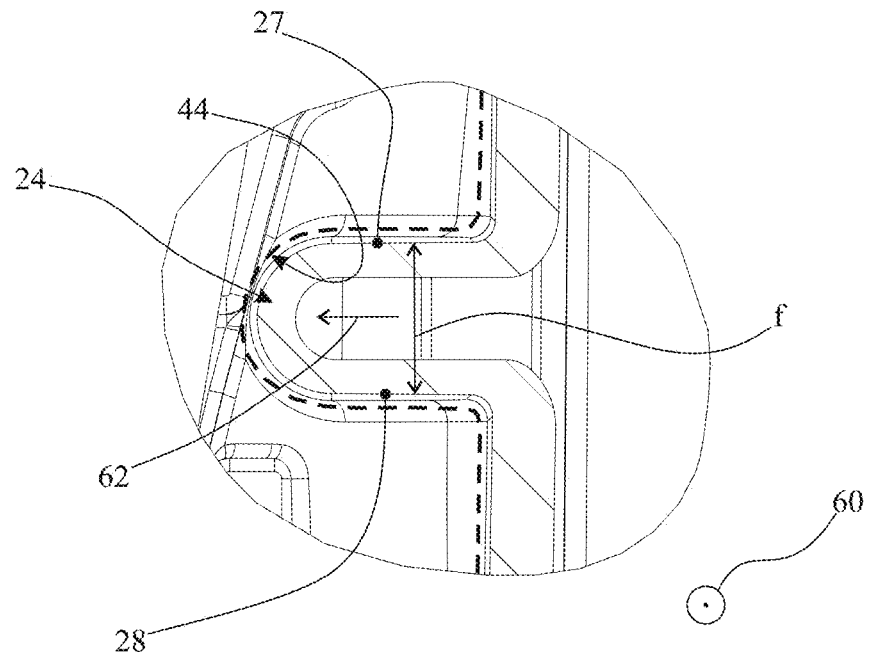
FIG. 6 shows an enlarged detailed illustration of a detail marked in FIG. 5 with VI.

In FIG. 5 the battery 40 is schematically marked with a dashed line. FIG. 6 shows a detail from FIG. 5. The second positioning element 24 engages into the second counter element 44. In the ready-to-use state of the work apparatus 1, the second positioning element 24 has two side flanges 27 and 28, opposite each other in the direction perpendicular to the insertion direction 60 and in the direction of the longitudinal central plane E. A flange distance f of the two side flanges 27 and 28, measured in the direction parallel to the longitudinal central plane E and perpendicular to the insertion direction 60, is designed in the direction 62 perpendicular to the longitudinal central plane E, so that demoulding of the battery compartment 20 is possible in production of the battery compartment 20. In this case, the side flanges 27 and 28 can be both the side flanges of a second positioning element 24, designed as a groove, as well as the side flanges of a second positioning element 24, designed as a projecting rib. In the exemplary embodiment, the second positioning element 24 is designed as a projecting rib. In the exemplary embodiment, the flange distance f decreases in the direction 62 perpendicular to the longitudinal central plane E. The fact that the first side wall 21 of the battery compartment 20 and the second side wall 22 of the battery compartment 20 run diagonal to each other in the first state, in particular when the battery compartment element is demoulded, and that the flange distance f decreases in the direction 62 perpendicular to the longitudinal central plane E in the ready-to-use state of the work apparatus 1, i.e. when the side walls 21 and 22 have been moved towards each other, means that the distance of the two side flanges 27 and 28 decreases in the direction away from the base wall 25 in the first state of the battery compartment element. Expressed in other words, the two side flanges 27 and 28 run towards each other in a section plane parallel to the longitudinal central plane E through the second positioning element 24 in the first state of the battery compartment element, in the direction away from the base wall 25. This enables simple demoulding of the battery compartment element, in particular of the second positioning element 24. The corresponding description of the second positioning element 24 and the associated side flanges 27 and 28 applies in an analogous manner to the first positioning element 23. The sectional illustration through the first positioning element 23 is almost identical to the sectional illustration through the second positioning element 24, shown in FIG. 6.

The first state of the work apparatus 1 can either be a demoulding state or an open state. In the demoulding state of the work apparatus 1, the battery compartment element is in an undeformed state compared to the form specified by the casting mould. In the open state of the work apparatus 1, the battery compartment element is in a state between the demoulding state and the ready-to-use state of the battery compartment element. The longitudinal ends 29 and 30 of the battery compartment element are further converged to each other than in the demoulding state of the battery compartment element, but they are less converged to each other than in the ready-to-use state of the battery compartment element. In the demoulding state of the battery compartment element, the work apparatus 1 is not yet fully assembled. In the open state of the work apparatus 1, the work apparatus 1 is fully assembled. In the open state of the battery compartment element, the battery compartment 20 is not yet placed on the battery 40 so that the work apparatus 1 is ready-to-use. In the ready-to-use state of the work apparatus 1, the battery 40 is clamped between the first side wall 21 and the second side wall 22, in particular between the first positioning element 23 and the second positioning element 24.

In the ready-to-use state of the work apparatus 1, the back positioning element distance a2 (FIG. 20) is measured at a back height in relation to the insertion direction 60. In the first state of the work apparatus 1 (i.e. in the demoulding state or in the open state), the first positioning element 23 has a back first distance b2 to the second positioning element 24 measured at a back height perpendicular to the longitudinal central plane E, in relation to the insertion direction 60. (In FIG. 20 the back distance a2 and the back first distance b2 (b2a, b2b) are illustrated at different heights for illustrative purposes, actually all three sizes are measured at the same, specifically the back, height.) The back first distance b2 is measured at the same point in the longitudinal central plane E as the positioning element distance a2. In the exemplary embodiment, the battery 40 is arranged at the same point with the measurement of the back first distance b2 relative to the tool 2 as with the measurement of the positioning element distance a2. Only the battery compartment element, in particular the second side wall 22, in particular the second positioning element 24, has its position changed relative to the battery 40, in particular relative to the tool 2.

The back first distance b2 is greater than the back positioning element distance a2. In the demoulding state, the back first distance b2 is referred to as a demoulding distance b2a. In the open state, the back first distance b2 is referred to as an open distance b2b. In each case, the back first distance b2 is greater than the positioning element distance a2. The demoulding distance b2a is greater than the open distance b2b.

FIG. 20 shows the three different states of the battery compartment element. In the demoulding state, the distance of the first longitudinal end 29 and the second longitudinal end 30 is at the greatest. In the ready-to-use state of the battery compartment element, the distance of the first longitudinal end 29 and the second longitudinal end 30 is at the smallest. In the open state of the battery compartment element, the distance of the longitudinal end 29 and the second longitudinal end 30 is smaller than in the ready-to-use state and greater than in the demoulding state. In the exemplary embodiment according to FIG. 20, the battery compartment element is brought from the demoulding state into the open state during assembly of the work apparatus 1. FIG. 12 shows the battery compartment element in the demoulding state. FIG. 9 shows the battery compartment element in the ready-to-use state. In the exemplary embodiment according to FIGS. 1 to 13, only two states of the battery compartment element are provided, specifically the demoulding state and the ready-to-use state. Before assembly of the work apparatus 1, the battery compartment element is in the demoulding state. After assembly of the work apparatus 1, only one single state of the battery compartment element exists, specifically the ready-to-use state. In this exemplary embodiment, in the ready-to-use state of the battery compartment element, the battery 40 can be introduced into the battery compartment 20.

Figure 10:
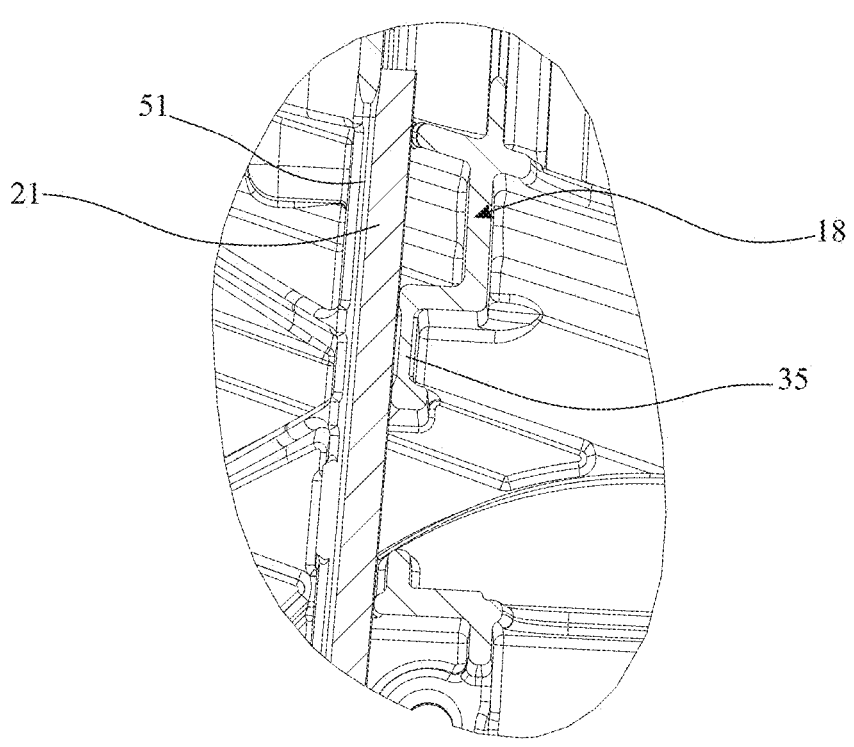
FIG. 10 shows an enlarged detailed illustration of a detail marked in FIG. 9 with X.
Figure 11:
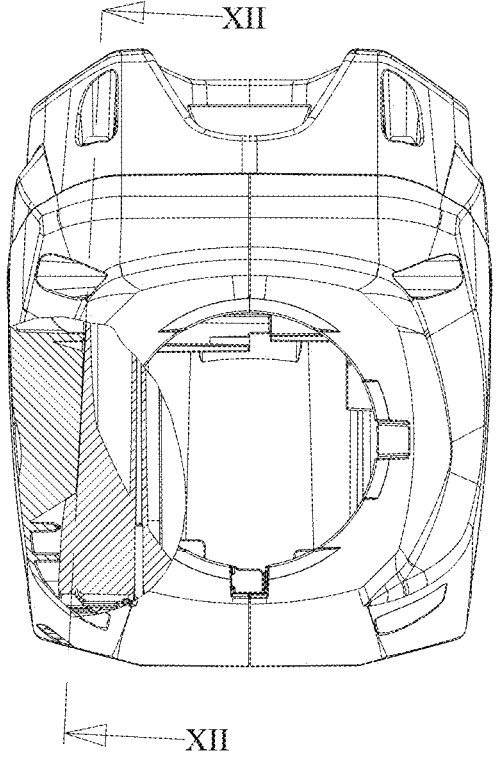
FIG. 11 shows a partial sectional illustration of the composed assembly from FIG. 7 along the section plane marked in FIG. 9 with XI-XI.

In all exemplary embodiments, the work apparatus 1 comprises a housing. The housing is formed by the housing halves 18 and 19. FIG. 7 shows the two housing halves 18 and 19 between which the battery compartment element is accommodated. The two housing halves 18 and 19 form a part of the battery compartment 20. The housing half 18, 19 delimits the region of the battery compartment element between the two side walls 21 and 22. During assembly of the work apparatus 1, the housing half 18, 19 ensures deformation of the battery compartment element. The battery compartment element is initially clamped between the two housing halves. As illustrated in FIG. 10, in this case the first side wall 21 is placed on the housing half 18. In the same manner, the first side wall 21 is placed on the second housing half 19. In an analogous manner, the second side wall 22 is placed on the first housing half 18 and/or on the second housing half 19. Therefore, the longitudinal ends 29 and 30 are moved a little towards each other. In the exemplary embodiment according to FIGS. 1 to 13, the ready-to-use state of the battery compartment element is already achieved with the deformation of the battery compartment element caused by the two housing halves 18 and/or 19. In the exemplary embodiment according to FIGS. 14 to 20, the open state is only achieved with the deformation caused by the two housing halves 18 and/or 19. In all exemplary embodiments, the tension element is formed by the housing. The first housing half 18 forms a first tension element. The second housing half forms a second tension element.

In all exemplary embodiments, the battery compartment element is arranged at least partially in the housing. The battery compartment element is delimited by the housing in the region between the first side wall 21 and the second side wall 22. Therefore, the battery compartment 20 is formed.

In the exemplary embodiment according to FIGS. 1 to 13, the continuous deformation of the battery compartment element is additionally secured by putting on the hood 33 illustrated in FIG. 7. Extensions are designed on the longitudinal ends 29 and 30, in the exemplary embodiment in the form of pins, which engage into corresponding openings in the hood, when fitting the hood. In this case, the side walls 21 and 22 are secured in their final position. The hood 33 is fixed to the housing halves 18 and 19 by means of fixing elements. A good force transmission between the hood and the side walls 21 and 22 of the battery compartment element takes place as a result of the arrangement of the extensions on the longitudinal ends 29 and 30. The extensions are designed with the same material as the side wall 21 or as the side wall 22. The extensions are produced together with the battery compartment element in the same casting process step, in particular in the same injection-moulding process step, in particular in the same plastic injection-moulding process step.

Figure 13:
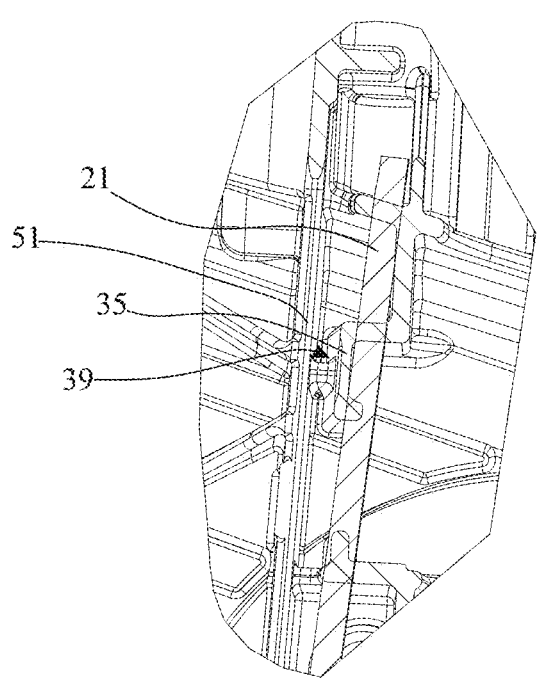
FIG. 13 shows an enlarged detailed illustration of the detail marked in FIG. 12 with XIII.

As illustrated in FIGS. 5, 7, 10 and 13, the first housing half 18 has at least one first contact projection 35 and at least one second contact projection 36. The first contact projection 35 serves to install the first side wall 21 of the battery compartment element thereon. The second contact projection 36 serves to install the second side wall 22 of the battery compartment element thereon. During assembly of the work apparatus 1, initially the battery compartment element is clamped between the first contact projection 35 and the second contact projection 36, in particular, in this case, the first contact element 23 and the second contact element 24, in particular the first longitudinal end 29 and the second longitudinal end 30, converge to each other. The first housing half 18 further has a first sealing element 51 and a second sealing element 52 (FIG. 5). The first sealing element 51 serves to seal the transition between the first side wall 21 of the battery compartment element and the part of the housing of the work apparatus 1, which forms a part of the battery compartment 20. The second sealing element 52 serves to seal the transition between the second side wall 22 of the battery compartment element and the part of the housing of the work apparatus 1, which forms a part of the battery compartment 20. During assembly of the battery compartment element, the first side wall 21 is inserted between the first contact projection 35 and the first sealing element 51. A gap 39, illustrated in FIG. 13, is designed between the first contact projection 35 and the first sealing element 51 for the first side wall 21. The first sealing element 51 overlaps the inner side of the first side wall 21 in an edge region of the first side wall 21. During assembly of the battery compartment element, the second side wall 22 is inserted between the second contact projection 36 and the second sealing element 52. The second sealing element 52 overlaps the inner side of the second side wall 22 in an edge region of the second side wall 22.

Subsequently, the second housing half 19 is assembled. The second housing half 19 has a first contact projection 37, analogous to the first contact projection 35 of the first housing half 18. The second housing half 19 has a second contact projection 38, analogous to the second contact projection 36 of the first housing half 18. The second housing half 19 has a first sealing element 53, analogous to the first sealing element 51 of the first housing half 18. The second housing half 19 has a second sealing element 54, analogous to the second sealing element 52 of the first housing half 18. This is illustrated in FIG. 5. The description of these components in relation to the first housing half 18 applies to the corresponding components of the second housing half 19, in an analogous manner.

As illustrated in FIGS. 7 to 9, transverse constrictions 34 are provided in the base wall 25. The constrictions 34 extend in the direction of the longitudinal plane E. The constrictions 34 extend in the direction perpendicular to the insertion direction 60. The constrictions 34 extend originating from the free edge of the base wall 25. The free edge is free from the side walls 21 and 22. The free edge delimits the base wall 25 in the direction transverse, in particular perpendicular, to the longitudinal direction 63 of the work apparatus 1. In the ready-to-use state of the battery compartment element, the free edge delimits the base wall 25, in the direction perpendicular to the insertion direction 60 and the longitudinal central plane E. The free edge is arranged between the first side wall 21 and the second side wall 22. In the exemplary embodiment, two free edges are opposite each other. In the exemplary embodiment, two constrictions are provided which are facing each other. The constrictions 34 are incisions into the base wall 25. Good deformability of the battery compartment element is assured as a result of the constrictions 34. Movement of the longitudinal ends 29 and 30 against each other is facilitated.

The constrictions 34 serve simultaneously as an outlet opening for fluid from the battery compartment, as illustrated for example in FIG. 8. Fluid can be guided through the constrictions 34 from the battery compartment 20 to the outer side of the work apparatus 1.

In the exemplary embodiment, the battery compartment 20 is sealed to the remaining components of the work apparatus 1 inwards by the housing halves 18 and 19. In particular, cool air for cooling the electric motor 3 cannot escape into the battery compartment. In particular, cool air for the electric motor 3 cannot be sucked in via the battery compartment 20 either.

In the exemplary embodiment according to FIGS. 14 to 20, the battery compartment element can assume three states, as already described for FIG. 20. Before assembly of the work apparatus 1, the battery compartment element is in the demoulding state. After assembling the work apparatus 1, the battery compartment element is either in the open state or in the ready-to-use state. In the exemplary embodiment according to FIGS. 14 to 20, the battery 40 is introduced into the battery compartment 20 when the battery compartment element is in the open state. Subsequently, the battery compartment element is brought into the ready-to-use state.

As illustrated in FIG. 20, the transition between the base wall 25 and the second side wall 22 forms a hinge. The second side wall 22 can be pivoted around a pivot axis 32 with respect to the base wall 25 at the transition between the base wall 25 and the second side wall 22. In the exemplary embodiment according to FIG. 20, the base wall 25 of the battery compartment element is rigidly integrated in the housing of the work apparatus 1. Structurally, no relative movement of the base wall 25 relative to the housing of the work apparatus 1, in particular relative to the tool 2, is provided. In the exemplary embodiment according to FIG. 20, the first side wall 21 of the battery compartment element is rigidly connected in the housing of the work apparatus 1. Structurally, no relative movement of the first side wall 21 relative to the housing of the work apparatus 1, in particular relative to the tool 2, is provided. It can be provided that both the base wall 25 as well as the first side wall 21 of the battery compartment element are held firmly and immovably relative to the housing of the work apparatus 1, in particular relative to the tool 2. The second side wall 22 is moved with respect to the base wall 25 around the pivot axis 32 due to the material characteristics of the battery compartment element. The battery compartment element can be deformed, in particular bent, so that the second side wall 22 is pivoted with respect to the base wall 25.

Figure 14:
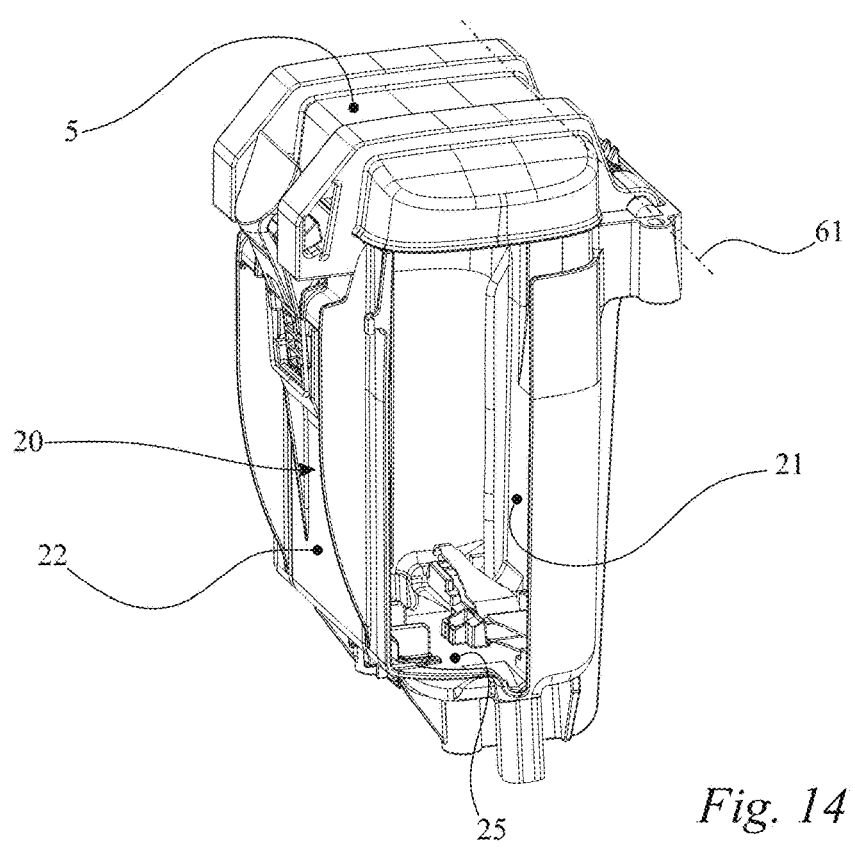
FIG. 14 shows a perspective illustration of an alternative exemplary embodiment for a battery compartment element having a cover placed thereon.
Figure 15:
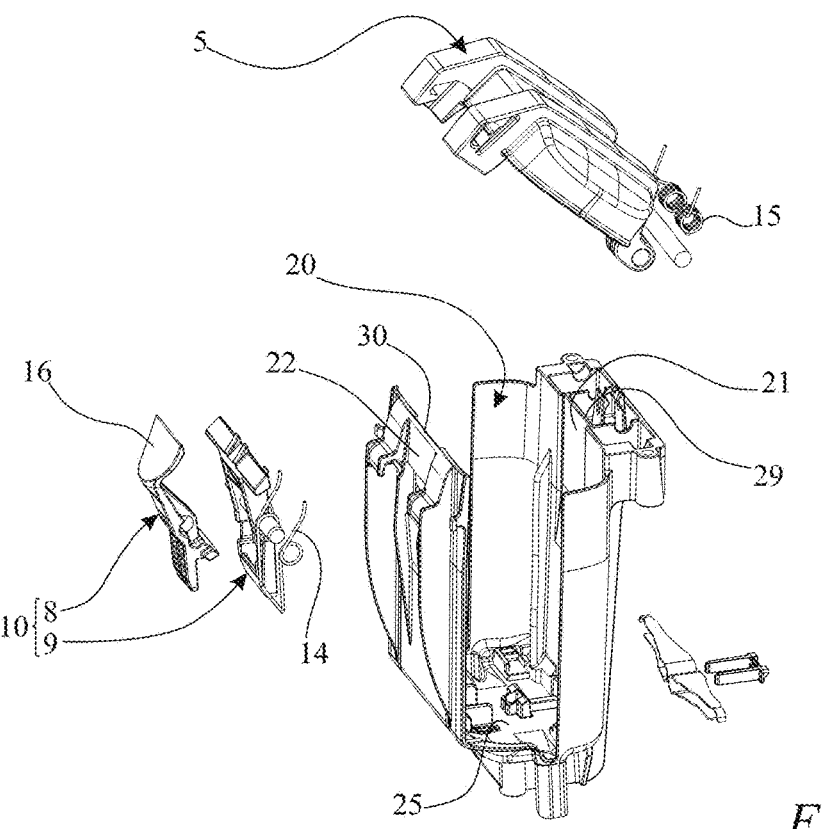
FIG. 15 shows an exploded illustration of the battery compartment element from FIG. 14.
Figures 16, 17:
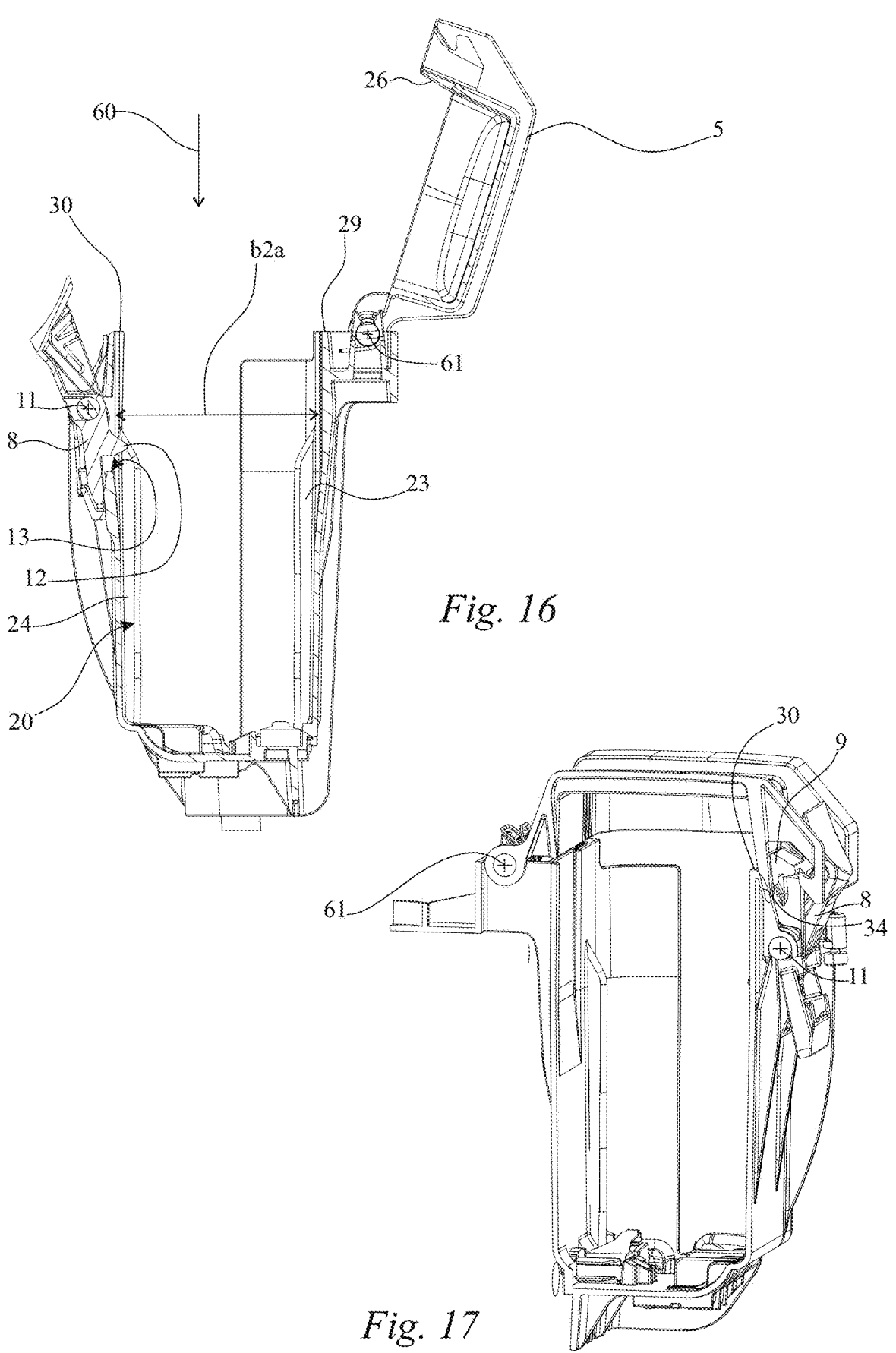
FIG. 16 shows a sectional illustration of a side view of the battery compartment element from FIG. 14 with the cover opened.
FIG. 17 shows a perspective illustration of a section through the battery compartment element from FIG. 14 during the closing of the cover.
Figures 18, 19:
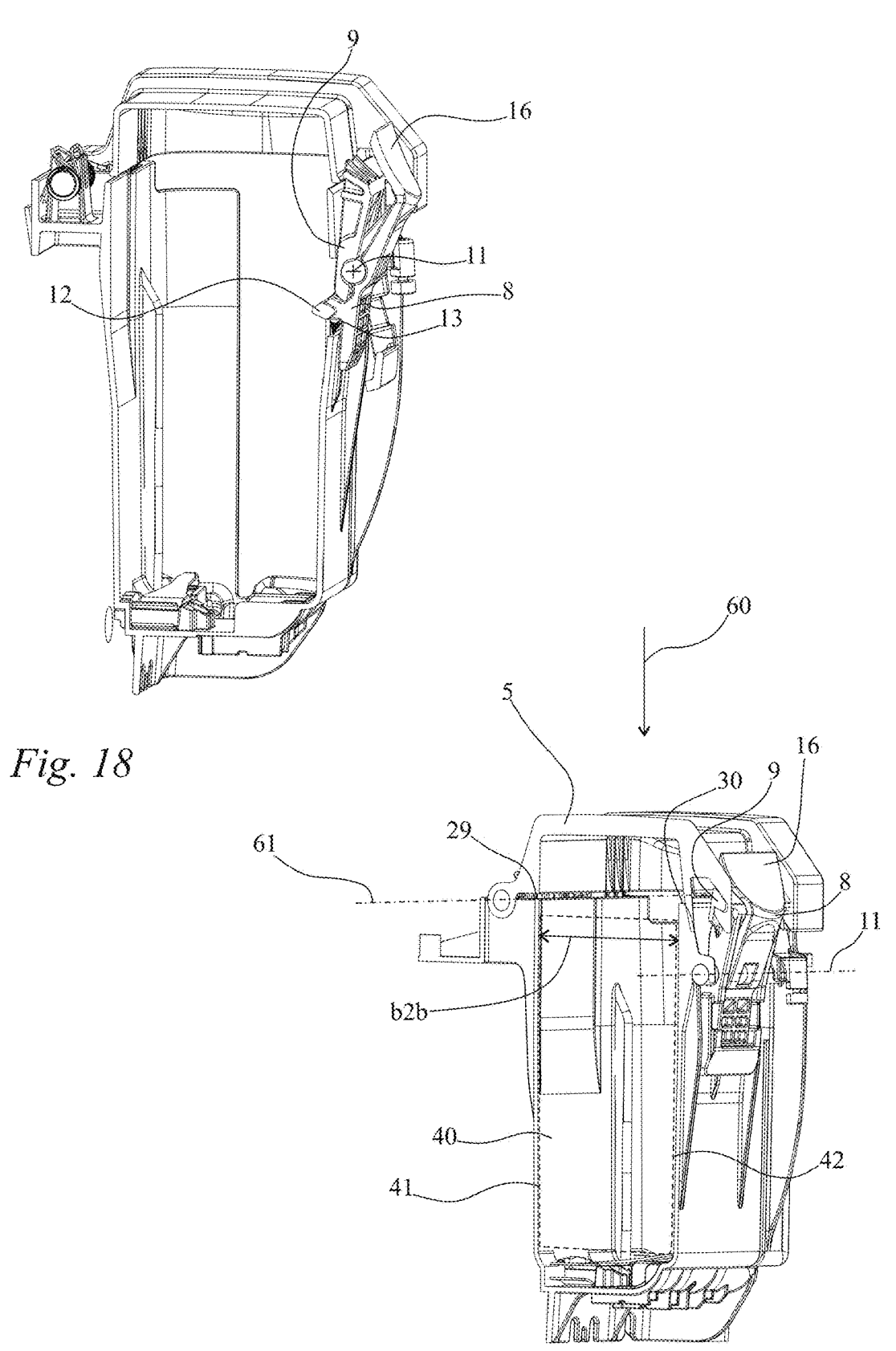
FIGS. 18 and 19 show a perspective illustration of sections through the battery compartment element from FIG. 14 with the cover closed.

As illustrated in particular in FIGS. 14 and 15, it can be provided, in particular in the second exemplary embodiment, that the work apparatus 1 comprises a cover 5 for the battery compartment 20. The cover 5 can be pivoted around a pivot axis 61. In the ready-to-use state of the work apparatus 1, in the exemplary embodiment, the pivot axis 61 extends parallel to the longitudinal central plane E. The cover 5 is mounted pivotably around the pivot axis 61. In particular, the cover 5 is mounted on the battery compartment 20, in particular in the region of the first longitudinal end 30 of the first side wall 21. In the ready-to-use state of the work apparatus 1, the cover 5 is closed. In the open state of the battery compartment 20, the cover is opened. The work apparatus 1 is designed so that the cover 5 moves the second longitudinal end 30 of the second side wall 28 to the pivot axis 61 of the cover 5 during the transition from the first state of the work apparatus 1 or the battery compartment 20 to the ready-to-use state of the work apparatus 1 or the battery compartment 20. This is illustrated, for example, in FIGS. 16 to 20. FIG. 16 shows the battery compartment element in the open state. FIG. 19 shows the battery compartment element in the ready-to-use state. In the ready-to-use state of the battery compartment element, in the exemplary embodiment according to FIGS. 14 to 20, the cover 5 is closed. In the exemplary embodiment, the cover 5 ensures a reduction of the distance between the second side wall 22 and the first side wall 21, in particular between the second longitudinal end 30 and the first longitudinal end 29, when pivoting the cover 5 around the pivot axis 61 and closing the cover 5.

As illustrated in FIG. 16, the cover 5 has a convergence element 26. The convergence element 26 is a diagonal surface designed on the cover 5. In the exemplary embodiment, the cover 5 is substantially cup-shaped. The convergence element 26 is arranged on the inner side of the cover 5. The cover 5 has a circumferential wall. With the cover 5 closed, the circumferential wall runs, in particular in a closed configuration, around the insertion direction 60. The convergence element 26 is arranged on the circumferential wall, in the exemplary embodiment designed by the circumferential wall. The convergence element 26 is arranged on the cover 5 opposite the pivot axis 61. The diagonal surface of the convergence element 26 runs in particular diagonally in relation to the lateral surface of an imaginary cylinder, the cylindrical axis of which is the pivot axis 61 and the lateral surface of which cuts the convergence element 24. The diagonal surface points to the pivot axis 61. The convergence element 26 interacts with the battery compartment element, in particular with the second side wall 22, in particular with the second longitudinal end 30, when closing the cover 5. In this case, the second positioning element 24 converges to the first positioning element 23. In particular, in this case, the second longitudinal end 30 converges to the first longitudinal end 29. When closing the cover 5, the convergence element 26 interacts with the second longitudinal end 30, in particular with a counter surface 34 designed on the second longitudinal end 30 (FIG. 17). The counter surface 34 of the convergence element 26 runs in particular diagonally in relation to the lateral surface of the imaginary cylinder, the cylindrical axis of which is the pivot axis 61 and the lateral surface of which cuts the convergence element 24. The counter surface 34 is arranged on the outer side of the battery compartment element. The counter surface 34 is arranged on the outer side of the second side wall 22. The counter surface 34 points away from the pivot axis 61. The convergence element 24 comes into contact with the counter surface 34 when pivoting the cover 5 around the pivot axis 61. The convergence element 24 corresponds to the counter surface 34. The convergence element 24 pushes the counter surface 34 in the direction of the pivot axis 61. In an alternative embodiment, it can also be provided that the convergence element 26 is not designed on the cover 5, but on the battery compartment element, in particular on the second side wall 22, in particular on the second longitudinal end 30, in particular as a diagonal surface. In particular, the convergence element is the only diagonal surface to converge the two longitudinal ends 29 and 30 to each other.

In the open state of the battery compartment element illustrated in FIG. 16, the battery 40 is inserted into the battery compartment 20. With the transition into the ready-to-use state of the work apparatus 1 or the battery compartment element, the first longitudinal end 29 and the second longitudinal end 30 converge to each other so that at least one partial region of the first positioning element 23 converges to a partial region of the second positioning element 24. In the exemplary embodiment according to FIGS. 16 to 20, the battery 40 is located between the first side wall 21 and the second side wall 22 when converging the first longitudinal end 29 and the second longitudinal end 30. The first longitudinal end 29 and the second longitudinal end 30 converge to each other so far that the battery 40 is clamped, in particular becomes clamped, between the first longitudinal end 29 and the second longitudinal end 30, in particular between the first positioning element 23 and the second positioning element 24. This is illustrated schematically in FIG. 19. The battery compartment element is then in the ready-to-use state. The work apparatus 1 is then in the ready-to-use state. To remove the battery 40 from the battery compartment 20, the second longitudinal end 30 is moved away from the first longitudinal end 29, so that the battery 40 is released. For this purpose, in the exemplary embodiment according to FIGS. 16 to 20, the cover 5 is opened.

As illustrated in FIGS. 16 and 19, the work apparatus 1 comprises a battery holder element 8. In the exemplary embodiment, the battery holder element 8 is designed as a pivot lever. The pivot lever is pivotably mounted around a lever pivot axis 11. In the exemplary embodiment, the battery holder element 8 is mounted on the battery compartment element, in particular on the second side wall 22, in particular in the region of the second longitudinal end 30, of the battery compartment element. The battery holder element 8 has a projection 12. The projection 12 is shaped like a hook. The projection 12 is facing towards the interior of the battery compartment 20, in particular the battery 40. The second side wall 22 has a through opening 13. The through opening 13 is designed so that the projection 12 of the battery holder element 8 can protrude from the outer side of the second side wall 22 through the through opening 13 into the battery compartment 20, in particular to the inner side of the second side wall 22. The battery 40 has a counter contour, not shown. The counter contour of the battery 40 serves to interact with the battery holder element 8, in particular with the projection 12 of the battery holder element 8. In the ready-to-use state of the work apparatus 1, the battery holder element 8, in particular the projection 12 of the battery holder element 8, engages into the counter contour of the battery 40. In this manner, the battery is secured against movement counter to the insertion direction 60 in the battery compartment. The counter contour of the battery 40 is arranged on the second outer side 42 of the battery 40. In the exemplary embodiment, the counter contour of the battery is a recess in the second outer side of the battery 40. The fact that the counter contour is arranged on the second outer side 42 of the battery 40, means that batteries with different battery lengths l can be secured by the battery holder element 8. Batteries with different lengths l can be inserted into the battery compartment. The length l of the battery 40 is selected in the exemplary embodiment such that the battery 40 does not lie on the cover 5 when the cover 5 is closed.

To remove the battery 40, the battery holder element 8 has to be pivoted around the lever pivot axis 11 so that the battery holder element 8, in particular the projection 12, is no longer in contact with the battery 40, in particular no longer in contact with the counter contour of the battery 40. The counter contour of the battery 40 can be a groove. FIGS. 16 to 19 show the battery holder element 8 only in a position in which the battery 40 would be or is secured by the battery holder element 8.

The work apparatus 1 comprises a cover holder element 9, illustrated in FIGS. 15 and 19. In the closed state of the cover 5, the cover holder element 9 prevents opening of the cover 5. The cover holder element 9 is formed in the shape of a hook. In the exemplary embodiment, the cover holder element 9 is a lever which can be pivoted around a pivot axis. In the exemplary embodiment, the work apparatus 1 is designed so that the battery holder element 8 and the cover holder element 9 can be pivoted around the same pivot axis, specifically the lever pivot axis 11. The cover holder element 9 is mounted on the battery compartment element, in particular on the second side wall 22, in particular in the region of the second longitudinal end 30 of the battery compartment element. As illustrated in FIG. 15, the work apparatus 1 comprises a retaining spring 14. The cover holder element 9 is pre-tensioned into the position in which the cover 5 is secured against opening. A corresponding counter contour for engaging the cover holder element 9, in particular for engaging a hook-shaped extension of the cover holder element 9, is formed on the cover 5. In the closed state of the cover 5, the cover holder element 9, in particular the hook-shaped extension, engages into the cover 5, in particular into the counter contour of the cover 5. In the exemplary embodiment, the pre-tensioning of the cover holder element 9 into the position in which the cover 5 is secured by the cover holder element 9 takes place by the retaining spring 14.

The battery holder element 8 is pre-tensioned into the position, in which it secures the battery 40 in the battery compartment 20, so that movement counter to the insertion direction 60 is prevented by the battery holder element 8. In the exemplary embodiment, the pre-tensioning of the battery holder element 8 is similarly caused by the retaining spring 14.

FIG. 19 shows the work apparatus 1 in a state in which the battery 40 in the battery compartment 20 is secured against movement counter to the insertion direction 60 by the battery holder element 8. The cover 5 is secured against the cover 5 opening by the cover holder element 9, in particular by the interaction between the hook-shaped extension of the cover holder element 9 and the counter contour of the cover 5. To open the cover 5, pivoting the cover holder element 9 around the lever pivot axis 11 is required. In the exemplary embodiment, the work apparatus 1 is designed so that, to open the cover 5, the extension of the cover holder element 9 has to be pivoted in the direction of the battery compartment 20, in particular in the direction of the battery 40. In this case, the cover holder element 9, in particular the hook-shaped extension of the cover holder element 9, is no longer engaged with the cover 5, in particular is no longer engaged with the counter contour of the cover 5. Subsequently, pivoting the cover 5 around the pivot axis 61 is possible. The cover 5 can be opened. In the exemplary embodiment, the cover 5 is pre-tensioned into the open position. For this purpose, the opening spring 15 illustrated in FIG. 15 is provided. After pivoting the cover holder element 9, in particular the hook-shaped extension of the cover holder element 9, in the direction of the battery compartment 20, in particular of the battery 40, the cover 5 opens automatically due to its pre-tensioning in the direction of the open position of the cover 5.

In the exemplary embodiment, the battery holder element 8 and the cover holder element 9 together form a holder element 10. The holder element 10 is designed so that not only pivoting the cover holder element 9, but also simultaneously pivoting the battery holder element 8 takes place when actuating the battery holder element 8 in the closed state of the cover 5. The holder element 10 is pivoted when unlocking the cover 5 by pivoting the cover holder element 9 as an assembly. With the single pivoting movement of the holder element 10, both the cover 5 is unlocked so that it can be opened, and the battery 40 is unlocked so that it can be removed from the battery compartment 20.

The battery 40 is inserted into the battery compartment 20 when the cover 5 is opened. In the exemplary embodiment according to FIGS. 14 to 20, the battery compartment element is located in the battery compartment 20 in the open state when inserting the battery 40. As illustrated in FIG. 16, the battery holder element 8, in particular the projection 12, of the battery holder element 8, projects into the battery compartment 20. When introducing the battery 40 into the battery compartment 20, the projection 12 is pivoted by pivoting the battery holder element 8 due to the installation of the battery 40 on the projection 12. The battery holder element 8, in particular the projection 12, evades the battery 40 during insertion into the battery compartment 20. Due to the pre-tensioning of the battery holder element 8, the battery holder element 8, in particular the projection 12, is moved into the counter contour in the battery 40 as soon as the counter contour of the battery 40 has reached the height of the projection 12. In this manner, the battery 40 is already secured in the open state of the battery compartment element in the battery compartment 20.

Subsequently, the cover 5 is closed. As illustrated in particular in FIG. 17, the cover 5 and the cover holder element 9 are designed so that, during the pivoting of the cover 5 around the pivot axis 61 in the direction of the closed position of the cover 5, the cover 5 pivots the cover holder element 9, in particular the hook-shaped extension of the cover holder element 9, a little way in the direction of the battery compartment 20, in particular in the direction of the battery 40. In this manner, the counter contour of the cover 5 can cross the hook-shaped extension of the cover holder element 9. Subsequently, the counter contour of the cover holder element 9 can reach behind the hook-shaped extension of the cover holder element 9. The cover holder element 9 is pre-tensioned accordingly. The retaining spring 14 acts both on the battery holder element 8 as well as on the cover holder element 9. The cover holder element 9 can be pivoted independently of the battery holder element 8 around the lever pivot axis 11. The cover holder element 9 can be pivoted due to the installation of the cover 5 on the cover holder element 9 when closing the cover 5, simultaneously, however, the battery holder element 8 can remain in the unchanged position. When closing the cover 5, the battery 40 is further secured in its position by the battery holder element 8. The projection 12 of the battery holder element 8 further engages into the corresponding counter contour in the battery 40.

The holder element 10 is designed so that the cover holder element 9 is simultaneously pivoted with it when unlocking the cover 5 by pivoting the battery holder element 8, in particular so that the battery holder element 8 is no longer engaged with the battery 40. This happens in the exemplary embodiment, such that the cover 5 is no longer engaged with the cover holder element 9 and opens. Therefore, simultaneously opening the cover 5 and unlocking the battery 40 is possible by a single pivot of the holder element 10 or the battery holder element 8. The battery holder element 8 has an actuating button 16 for this purpose. As illustrated in FIG. 18, the actuating button 16 is arranged on the longitudinal end of the battery holder element 8, opposite the projection 12 in relation to the lever pivot axis 11. By actuating the actuating button 16, the operator can pivot the battery holder element 8 and simultaneously the cover holder element 9 so that both the cover 5 is opened, and the battery 40 is unlocked. A force has to be applied against the action of the retaining spring 14, when actuating the actuating button 16.

Both in the exemplary embodiment according to FIGS. 1 to 13, as well as in the exemplary embodiment according to FIGS. 14 to 20, the first longitudinal end 29 and the second longitudinal end 30 converge to each other during the transition into the ready-to-use state of the work apparatus 1, so that at least one partial region of the second positioning element 24, in particular the half of the second positioning element 24, coupled to the second longitudinal end 30, converges to a partial region of the first positioning element 23, in particular to the half of the first positioning element 23, coupled to the first longitudinal end 29. In the exemplary embodiment according to FIGS. 1 to 13, this happens once during assembly of the work apparatus 1. Then, the battery compartment element is in the ready-to-use state. During assembly of the work apparatus 1, the first longitudinal end 29 and the second longitudinal end 30 converge to each other, in particular so that the back positioning element distance a2 is at most as large as the front positioning element distance a1 (FIG. 4). In the exemplary embodiment according to FIGS. 14 to 20, convergence of the positioning elements 23 and 24 happens again after each renewed introduction of the battery 40 into the battery compartment 20. The battery 40 is arranged between the first side wall 21 and the second side wall 22, while the first longitudinal end 29 and the second longitudinal end 30 converge to each other. The first longitudinal end 29 and the second longitudinal end 30 converge to each other so far that the battery 40 is clamped between the first longitudinal end 29 and the second longitudinal end 30, in particular between the first positioning element 23 and the second positioning element 24. In particular, the first positioning element 23 and the second positioning element 24 are placed on the battery 40. The battery compartment element, in particular the work apparatus 1, is then in the ready-to-use state. To remove the battery 40 from the battery compartment 20, the second longitudinal end 30 is moved away from the first longitudinal end 29, so that the battery 40 is released. In the exemplary embodiment according to FIGS. 14 to 20, the first longitudinal end 29 and the second longitudinal end 30 converge to each other in the open state of the battery compartment element during assembly of the work apparatus 1. The first longitudinal end 29 and the second longitudinal end 30 converge even further to each other than in the open state of the battery compartment element to subsequently clamp the battery 40 and to transition into the ready-to-use state of the work apparatus 1. The battery compartment element is then in the ready-to-use state. In the exemplary embodiment according to FIGS. 14 to 20, the ready-to-use state of the battery compartment 40 or the battery compartment element, is also referred to as the clamped state of the battery compartment 40 or the battery compartment element.

What is claimed is:

1. A work apparatus (1), comprising:
   a tool (2);
   an electric motor (3) for driving the tool (2);
   a battery (40) for supplying energy to the electric motor (3); and
   a battery compartment (20) for accommodating the battery (40),
   wherein the battery (40) is configured to be inserted into the battery compartment (20) in an insertion direction (60),
   wherein the battery (40) has a first outer side (41) and a second outer side (42),
   wherein the first outer side (41) and the second outer side (42) oppose each other,
   wherein in a ready-to-use state of the work apparatus (1) an imaginary longitudinal central plane (E) of the battery (40) runs in the insertion direction (60) between the first outer side (41) and the second outer side (42),
   wherein the work apparatus (1) comprises a position stabilization device (4),
   wherein the position stabilization device (4) has a first positioning element (23) and a second positioning element (24) on the battery compartment (20),
   wherein the position stabilization device (4) has a first counter element (43) on the first outer side (41) of the battery (40) and a second counter element (44) on the second outer side (42) of the battery (40),
   wherein in the ready-to-use state of the work apparatus (1) the first positioning element (23) corresponds at least to the first counter element (43), wherein in the ready-to-use state of the work apparatus (1) the second positioning element (24) corresponds at least to the second counter element (44), wherein the first positioning element (23); the second positioning element (24), the first counter element (43), and the second counter element (44) extend along the insertion direction (60), wherein in the ready-to-use state of the work apparatus (1) the battery (40) is arranged at least between the first positioning element (23) and the second positioning element (24), wherein the battery compartment (20) has a first side wall (21), the first side wall (21) being coupled to the first outer side (41) of the battery (40), wherein the battery compartment (20) has a second side wall (22), the second side wall (22) being coupled to the second outer side (42) of the battery (40), wherein the first side wall (21) and the second side wall (22) are connected to each other via a base wall (25), wherein the first side wall (21) has a first longitudinal end (29) and the second side wall (22) has a second longitudinal end (30), wherein the first longitudinal end (29) and the second longitudinal end (30) face away from the base wall (25), and wherein the first longitudinal end (29) and the second longitudinal end (30) are pressed toward each other.

2. The work apparatus according to claim 1, wherein the work apparatus (1) comprises a housing, and wherein the first longitudinal end (29) and the second longitudinal end (30) are pressed toward each other by the housing.

3. The work apparatus according to claim 2, wherein the housing comprises two housing halves (18, 19), and wherein the first longitudinal end (29) and the second longitudinal end (30) are pressed toward each other by at least one of the two housing halves (18, 19).

4. The work apparatus according to claim 2, wherein the battery compartment comprises a battery compartment element, wherein the battery compartment element is formed by the first side wall (21), the second side wall (22) and the base wall (25), and wherein the battery compartment element is arranged in the housing.

5. The work apparatus according to claim 4, wherein the battery compartment element is delimited by the housing between the first side wall (21) and the second side wall (22), whereby the battery compartment is formed.

6. The work apparatus according to claim 1, wherein the first side wall (21) alongside the first positioning element (23), the second side wall (22) alongside the second positioning element (24), and the base wall (25) are produced together in a casting process.

7. The work apparatus according to claim 6, wherein in the ready-to-use state of the work apparatus (1) the first positioning element (23) has two side flanges (27, 28) opposing one another in a direction perpendicular to the insertion direction (60) and parallel to the imaginary longitudinal central plane (E), and wherein a flange distance (f) of the two side flanges (27, 28), measured in the direction perpendicular to the insertion direction (60) and parallel to the imaginary longitudinal central plane (E), is designed so that demolding of the battery compartment (20) is possible during production of the battery compartment (20).

8. The work apparatus according to claim 1, wherein the work apparatus (1) has a first state in which it is not ready-to-use, wherein in the first state, the work apparatus (1) is not yet fully assembled, or the battery compartment (20) is not yet placed on the battery (40), wherein the work apparatus (1) is designed so that during a transition of the work apparatus (1) from the first state into the ready-to-use state, the first longitudinal end (29) of the first side wall (21) and the second longitudinal end (30) of the second side wall (22) converge toward each other, so that the battery (40) is clamped between the first side wall (21) and the second side wall (22).

9. The work apparatus according to claim 8, wherein in the ready-to-use state of the work apparatus (1) the first positioning element (23) has a back positioning element distance (a2) to the second positioning element (24) measured perpendicular to the imaginary longitudinal central plane (E), wherein in the ready-to-use state of the work apparatus (1) the back positioning element distance (a2) is measured in relation to the insertion direction (60) at a back height, wherein in the first state of the work apparatus (1) the first positioning element (23) has a back first distance (b2) to the second positioning element (24) measured perpendicular to the imaginary longitudinal central plane (E) at the back height in relation to the insertion direction (60), and wherein the back first distance (b2) is greater than the back positioning element distance (a2).

10. The work apparatus according to claim 8, wherein the work apparatus (1) comprises a cover (5) for the battery compartment (20), wherein the cover (5) is pivotably mounted around a pivot axis (61), wherein the cover (5) is opened in an open state, wherein the cover (5) is closed in the ready-to-use state, and wherein the work apparatus (1) is designed so that the cover (5) moves the second longitudinal end (30) of the second side wall (22) toward the pivot axis (61) in the transition from the first state of the work apparatus (1) to the ready-to-use state of the work apparatus (1).

11. The work apparatus according to claim 10, wherein the work apparatus (1) is designed so that the cover (5), when opened, enables the second longitudinal end (30) to move away from the first longitudinal end (29) in such a way that the battery (40) can be removed.

12. A method for producing a ready-to-use state of a work apparatus (1), wherein the work apparatus (1) comprises:

a tool (2), an electric motor (3) for driving the tool (2), a battery (40) for supplying energy to the electric motor (3), and a battery compartment (20) for accommodating the battery (40), wherein the battery compartment (20) has a first side wall (21), wherein the battery compartment (20) has a second side wall (22),

wherein the first side wall (21) and the second side wall (22) are connected to each other via a base wall (25) made from the same material as the first and second side walls, wherein the first side wall (25) has a first longitudinal end (29) facing away from the base wall (25), wherein the second side wall (22) has a second longitudinal end (30) facing away from the base wall (25), wherein the battery (40) can be inserted into the battery compartment (20) in an insertion direction (60), wherein the battery (40) has a first outer side (41) and a second outer side (42) which oppose each other, wherein in the ready-to-use state of the work apparatus (1) an imaginary longitudinal central plane (E) of the battery (40) runs in the insertion direction (60) between the first outer side (41) and the second outer side (42), wherein the work apparatus (1) comprises a position stabilization device (4), wherein the position stabilization device (4) has a first positioning element (23) on the first side wall (21) and a second positioning element (24) on the second side wall (22), wherein the position stabilization device (4) has a first counter element (43) on the first outer side (41) of the battery (40) and a second counter element (44) on the second outer side (42) of the battery (40), wherein at least in the ready-to-use state of the work apparatus (1) the first positioning element (23) corresponds to the first counter element (43), wherein at least in the ready-to-use state of the work apparatus (1) the second positioning element (24) corresponds to the second counter element (44), wherein the first positioning element (23), the second positioning element (24), the first counter element (43), and second counter element (44) extend along the insertion direction (60), wherein at least in the ready-to-use state of the work apparatus (1) the battery (40) is arranged between the first positioning element (23) and the second positioning element (24), wherein the first longitudinal end (29) and the second longitudinal end (30) converge toward each other during a transition into the ready-to-use state of the work apparatus (1), so that at least one partial region of the first positioning element (23) converges toward one partial region of the second positioning element (24).

13. The method according to claim 12, wherein in the ready-to-use state of the work apparatus (1) the first positioning element (23) has a front positioning element distance (a1) to the second positioning element (24) perpendicular to the imaginary longitudinal central plane (E), wherein in the ready-to-use state of the work apparatus (1) the first positioning element (23) has a back positioning element distance (a2) to the second positioning element (24) to the imaginary longitudinal central plane (E), wherein the first longitudinal end (29) and the second longitudinal end (30) converge toward each other during assembly of the work apparatus (1).

14. The method according to claim 12, wherein the battery (40) is arranged between the first side wall (21) and the second side wall (22), while the first longitudinal end (29) and the second longitudinal end (30) converge toward each other, and wherein the first longitudinal end (29) and the second longitudinal end (30) converge sufficiently close to each other that the battery (40) is clamped between the first longitudinal end (29) and the second longitudinal end (30).

15. The method according to claim 14, wherein the first longitudinal end (29) is turned away from the second longitudinal end (30) for removing the battery (40), so that the battery (40) is released.

16. The method according to claim 13, wherein during assembly of the work apparatus (1) the first longitudinal end (29) and the second longitudinal end (30) converge toward each other in an open state of the battery compartment (20), and wherein for subsequent clamping of the battery (40) and transition into the ready-to-use state of the work apparatus (1) the first longitudinal end (29) and the second longitudinal end (30) converge toward each other in a clamped state of the battery compartment (20) even more than in the open state of the battery compartment (20).

* * * * *